(12) United States Patent
Johnson et al.

(10) Patent No.: US 10,296,406 B2
(45) Date of Patent: *May 21, 2019

(54) ESTIMATING BIT ERROR RATE

(71) Applicant: Juniper Networks, Inc., Sunnyvale, CA (US)

(72) Inventors: John D. Johnson, Los Altos, CA (US); Tapan Kumar Chauhan, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 222 days.

This patent is subject to a terminal disclaimer.

(21) Appl. No.: 15/339,009

(22) Filed: Oct. 31, 2016

(65) Prior Publication Data

US 2017/0068580 A1    Mar. 9, 2017

Related U.S. Application Data

(63) Continuation of application No. 14/849,116, filed on Sep. 9, 2015, now Pat. No. 9,483,340.

(51) Int. Cl.
*H04L 1/00* (2006.01)
*H03M 13/00* (2006.01)
(Continued)

(52) U.S. Cl.
CPC ........ *G06F 11/076* (2013.01); *G06F 11/0706* (2013.01); *G06F 11/0709* (2013.01); *G06F 11/079* (2013.01); *G06F 11/0775* (2013.01); *G06F 11/0793* (2013.01); *H04L 1/203* (2013.01)

(58) Field of Classification Search
CPC ............ G06F 11/076; G06F 11/0709; G06F 11/0793; G01S 5/0252
See application file for complete search history.

(56) References Cited

U.S. PATENT DOCUMENTS 5,282,211 A    1/1994  Manlick et al.
5,710,783 A    1/1998  Luthi et al.
(Continued)

OTHER PUBLICATIONS

Redd, "Calculating statistical confidence levels for error-probability estimates", http://www.lightwaveonline.com/articles/print/volume-17/issue-5/features/calculating-statistical-confidence-levels-for-error-probability-estimates-53462167.html, Lightwave, Apr. 1, 2000, 16 pages.

(Continued)

*Primary Examiner* — Phung M Chung
(74) *Attorney, Agent, or Firm* — Harrity & Harrity, LLP

(57) ABSTRACT

A system may obtain a current bit error count that identifies a quantity of bit errors in a bit stream during a time interval. The system may determine that the current bit error count identifies one or more bit errors. The system may determine whether an estimated bit error rate (BER) for the bit stream is likely to satisfy a threshold. The system may select an approach for determining the estimated BER for the bit stream. The estimated BER may be determined based on combining the current bit error count with a quantity of bits received in the time interval when the estimated BER is likely to exceed the threshold, and the estimated BER may be determined based on the current bit error count and one or more past bit error counts when the estimated BER is unlikely to exceed the threshold. The system may determine the estimated BER.

20 Claims, 15 Drawing Sheets

(51) Int. Cl.
*H04L 1/24* (2006.01)
*G06F 11/07* (2006.01)
*H04L 1/20* (2006.01)

(56) References Cited

U.S. PATENT DOCUMENTS

| | | | |
|---|---|---|---|
| 6,591,383 | B1 | 7/2003 | Michel et al. |
| 6,744,496 | B2 | 6/2004 | Audouin et al. |
| 7,231,558 | B2 * | 6/2007 | Gentieu .............. H04L 1/243 |
| | | | 714/704 |
| 7,284,182 | B2 | 10/2007 | Raahemi |
| 7,320,095 | B2 | 1/2008 | Ohlen |
| 7,475,299 | B1 | 1/2009 | Brenes et al. |
| 8,831,075 | B1 | 9/2014 | Yuan et al. |
| 8,897,398 | B2 | 11/2014 | Whitby-Strevens |
| 8,990,645 | B2 | 3/2015 | Whitby-Strevens |
| 9,252,809 | B2 | 2/2016 | Hirth |
| 9,413,497 | B2 * | 8/2016 | Schnizler .............. H04L 1/241 |
| 9,417,945 | B2 * | 8/2016 | Authement ......... G06F 11/1048 |
| 9,483,340 | B1 | 11/2016 | Johnson et al. |
| 2013/0254604 | A1 | 9/2013 | Whitby-Strevens |

OTHER PUBLICATIONS

Redd, "Explaining those BER testing mysteries", http://www.lightwaveonline.com/articles/print/volume-21/issue-9/technology/explaining-those-ber-testing-mysteries-53908512.html, Lightwave, Sep. 1, 2004, 16 pages.

International Telecommunication Union, "Optical system design and engineering considerations", ITU-T, Series G, Telecommunication Standardization Sector of ITU, Supplement 39, Series G: Transmission Systems and Media, Digital Systems and Networks, Sep. 2012, 118 pages.

The Institute of Electrical and Electronics Engineers, Inc., "Amendment: Media Access Control (MAC) Parameters, Physical Layers, and Management Parameters for 10 Gb/s Operation", 802.3ae, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Aug. 30, 2002, 529 pages.

The Institute of Electrical and Electronics Engineers, Inc., "Amendment 4: Media Access Control Parameters, Physical Layers, and Management Parameters for 40 Gb/s and 100 Gb/s Operation", 802.3ba, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Jun. 22, 2010, 457 pages.

* cited by examiner

ESTIMATING BIT ERROR RATE

RELATED APPLICATION

This application is a continuation of U.S. patent application Ser. No. 14/849,116, filed Sep. 9, 2015 (now U.S. Pat. No. 9,483,340), the disclosure of which is incorporated herein by reference.

BACKGROUND

A network device may transmit information to another network device in a bit stream that is composed of bits. Some bits in the bit stream may be transmitted erroneously. For example, a network device reconfiguration, feedback in a line, an improperly configured network device, or the like, may cause erroneous bits to be transmitted. A bit error counter on a recipient network device may count a quantity of erroneous bits in the bit stream.

SUMMARY

A device may include one or more processors. The one or more processors may obtain a first bit error count that identifies a quantity of bit errors that occur in an interval of a bit stream. The one or more processors may determine that the first bit error count indicates that an error burst has occurred. The first bit error count may indicate that an error burst has occurred when the first bit error count identifies a plurality of bit errors. The one or more processors may determine an estimated bit error rate (BER) for the bit stream based on one or more burst check bit error counts. The one or more burst check bit error counts may be obtained after the first bit error count is obtained and before an amount of time associated with the interval has elapsed, and the one or more burst check bit error counts may be obtained based on the first bit error count indicating that the error burst has occurred. The one or more burst check bit error counts may identify a quantity of bit errors that occur in a burst check interval after the first bit error count is obtained. The one or more processors may selectively perform an action based on whether the estimated BER satisfies a threshold.

A non-transitory computer-readable medium may store one or more instructions that, when executed by one or more processors of a device, cause the one or more processors to obtain a bit error count that identifies a quantity of bit errors that occur in a bit stream during an interval of time. The one or more instructions may cause the one or more processors to determine that the bit error count identifies a bit error. The one or more instructions may cause the one or more processors to determine an estimated bit error rate (BER) based on the bit error count and based on information identifying one or more past bit error counts. The estimated BER may be determined based on comparing an observed bit error count to an expected bit error count of one or more windows. The one or more windows may correspond to one or more BERs in the one or more windows, and the observed bit error count may be determined based on the bit error count and/or the information identifying the one or more past bit error counts. The one or more instructions may cause the one or more processors to selectively perform an action based on whether the estimated BER satisfies a threshold.

A method may include obtaining a current bit error count that identifies a quantity of bit errors in a bit stream during a time interval. The method may include determining that the current bit error count identifies one or more bit errors. The method may include determining whether an estimated bit error rate (BER) for the bit stream is likely to satisfy a threshold. The method may include selecting an approach for determining the estimated BER for the bit stream based on whether the estimated BER is likely to satisfy the threshold. The estimated BER may be determined based on combining the current bit error count with a quantity of bits received in the time interval when the estimated BER is likely to exceed the threshold, and the estimated BER may be determined based on the current bit error count and one or more past bit error counts when the estimated BER is unlikely to exceed the threshold. The method may include determining the estimated BER based on the selected approach.

DETAILED DESCRIPTION

The following detailed description of example implementations refers to the accompanying drawings. The same reference numbers in different drawings may identify the same or similar elements.

A network device may receive a bit stream. Some bits of the bit stream may be erroneously transmitted, and may be detected by a bit error counter of the network device. The network device may estimate a bit error rate (BER) of the bit stream using, for example, a division model that divides the quantity of bit errors detected in a particular window by the quantity of bits included in the particular window. However, in some situations, estimating the BER by dividing the quantity of bit errors by the quantity of bits may be an unreliable way of obtaining an estimated BER. For example, when the BER is small (e.g., when bit errors are sparse relative to a quantity of bits received in the bit stream), long periods of time may pass between bit errors in the bit stream, and the division model may prove inaccurate. Implementations described herein enable the network device to determine whether the division model is likely to be sufficiently accurate to determine an estimated BER, and to use a statistical approach to determine the BER when the division model is not likely to be sufficiently accurate, which improves accuracy of the estimated BER and conserves processor resources. Further, implementations described herein enable the network device to adjust the estimated BER based on error bursts in the bit stream.

Figure 1A:
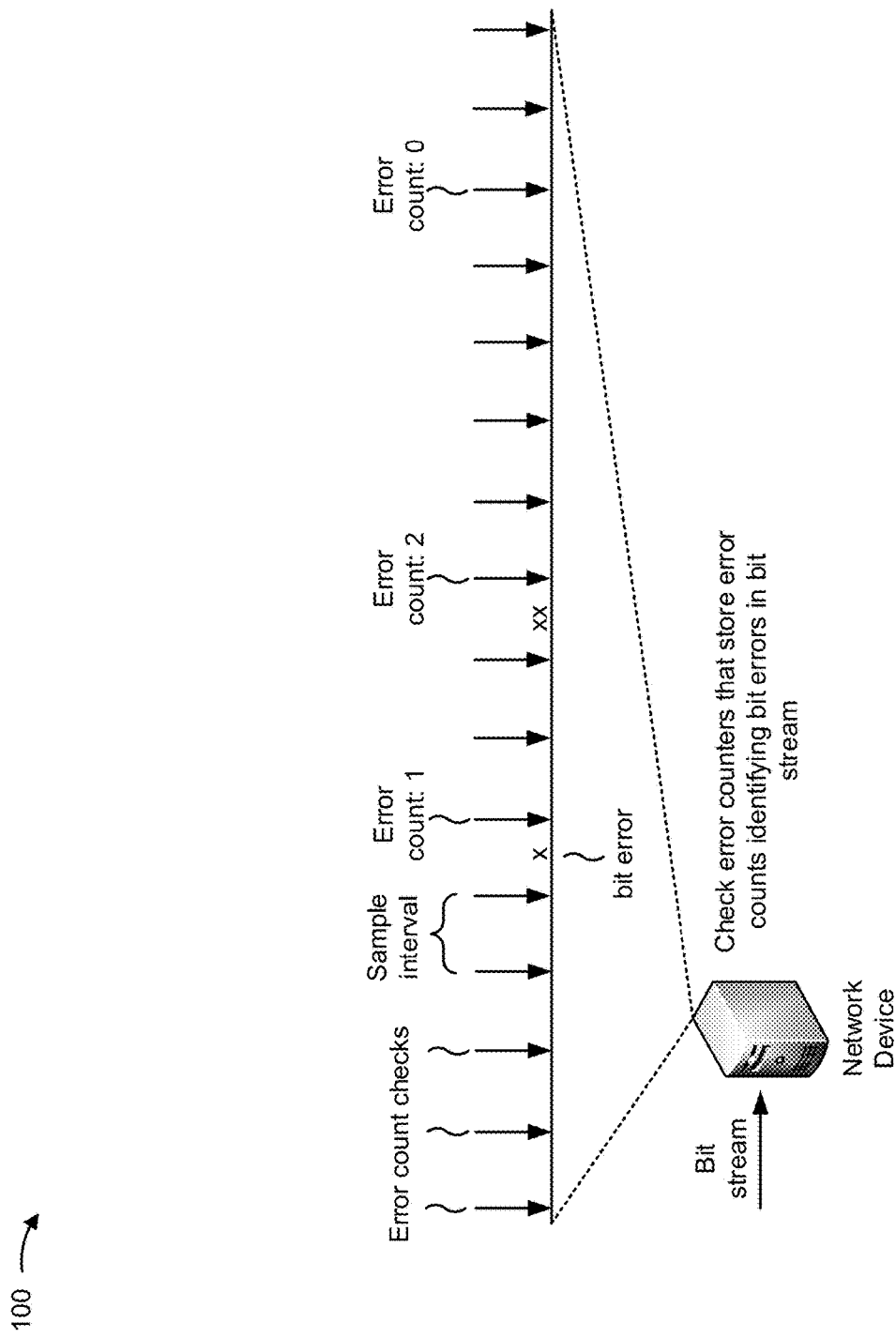
FIGS. 1A-1C are diagrams of an overview of an example implementation described herein.
Figure 1B:
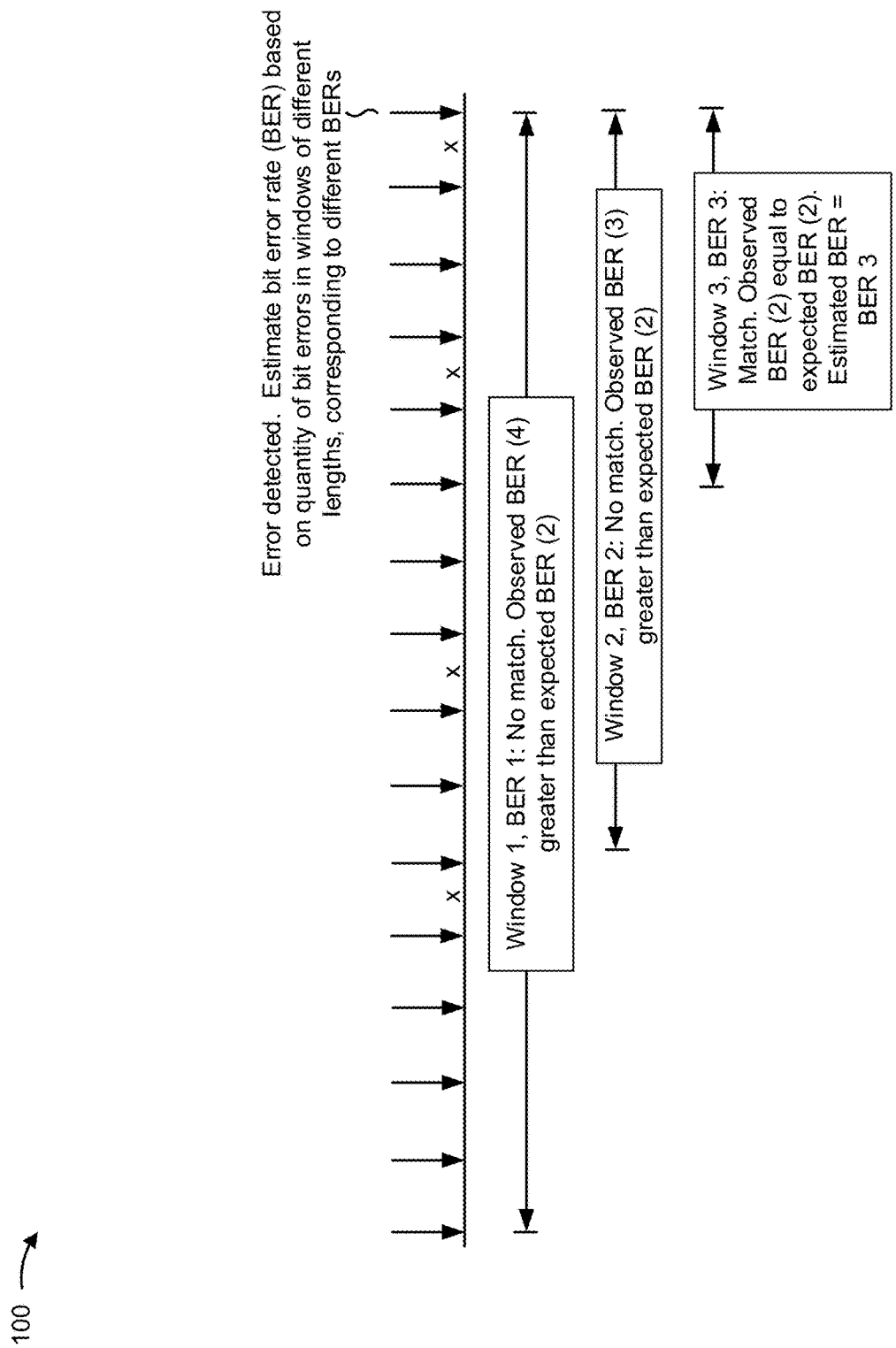
Figure 1C:
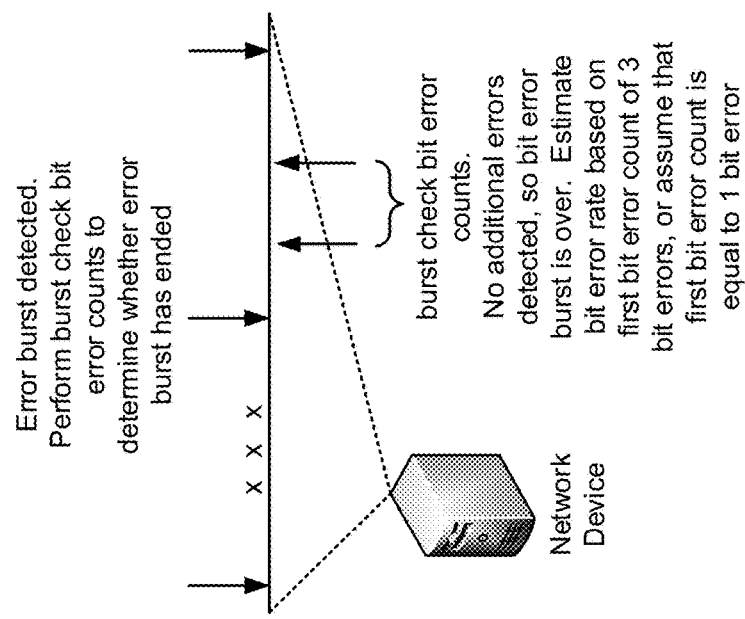

FIGS. 1A-1C are diagrams of an overview of an example implementation 100 described herein. As shown in FIG. 1A, a network device may receive a bit stream. As further shown, the network device may check error counters that store error counts. An error count may identify a quantity of bit errors that an error counter has detected in the bit stream. Here, error count checks are represented by vertical arrows and a bit error is represented by a small "x." As shown, the error count checks are performed at a time interval (e.g., an interval of time, an interval of received bits, etc.).

As shown in FIG. 1B, based on detecting an error in the bit stream, the network device may estimate a BER based on the detected error and/or previously detected errors. Here, as shown, four errors have been detected in the bit stream. The network device may estimate the BER, in some instances, based on windows of different lengths that correspond to different estimated BERs. For example, the network device may estimate the BER based on the windows when the BER is likely to be too low to estimate based on dividing the quantity of bit errors detected by the quantity of bits received.

A window of a longer length may correspond to a lower window BER (e.g., lower than a higher BER), and a window of a shorter length may correspond to a higher window BER. The network device may compare an observed bit error count in a window with a statistically determined expected bit error count for the window, and may determine whether the window BER corresponding to the window is appropriate for the estimated BER based on comparing the observed bit error count to the expected bit error count.

Here, the network device determines that BER 1 and BER 2, associated with Window 1 and Window 2, respectively, are not appropriate for the estimated BER based on Window 1 and Window 2 containing more bit errors than the expected bit error count. The network device determines that the estimated BER is equal to BER 3 based on the observed bit error count matching the expected bit error count for Window 3. In this way, the network device determines the estimated BER based on past error count checks and based on statistically determined windows corresponding to different BERs, which permits the network device to determine the estimated BER when bit errors are rare.

As shown in FIG. 1C, in some cases, the network device may detect an error burst. An error burst may occur when multiple bit errors occur in one interval, and may be caused by interference in a link, a network device reconfiguration, or the like. As shown, when the network device detects an error burst, the network device may obtain burst check bit error counts. The network device may determine whether the error burst has ended based on the burst check bit error counts. For example, if the burst check bit error counts identify multiple bit errors, the network device may determine that the error burst has not ended. Here, the burst check bit error counts identify no bit errors, so the network device determines that the error burst has ended.

As shown, the network device may determine the estimated BER based on the first bit error count of 3 bit errors (e.g., by dividing the first bit error count by a quantity of bits received in the interval and during the burst check bit error checks). As further shown, in some cases, the network device may determine the estimated BER by assuming that the first bit error count identifies one bit error (e.g., based on the error burst possibly being caused by an anomalous event, and to prevent the error burst from interfering with future estimated BERs). In this way, the network device determines an estimated BER after detecting an error burst, and determines whether the error burst has ended, which improves accuracy of the estimated BER and thus conserves processor resources of the network device that might otherwise be used to perform actions based on erroneous estimated BERs.

Figure 2:
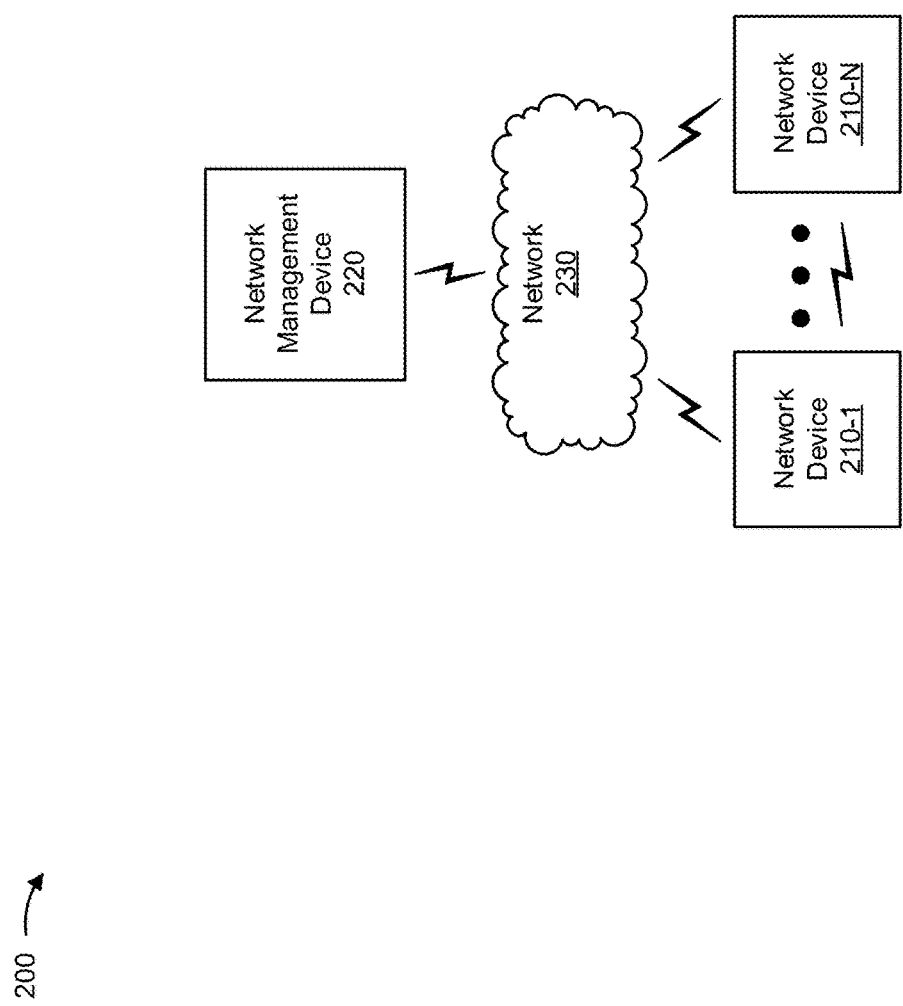
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (hereinafter referred to individually as "network device 210," and collectively as "network devices 210"), a network management device 220, and a network 230. Devices of environment 200 may interconnect via wired connections, wireless connections, or a combination of wired and wireless connections.

Network device 210 may include one or more devices capable of receiving, generating, processing, storing, and/or providing network traffic. For example, network device 210 may include one or more traffic transfer devices, such as a router, a gateway, a server, a hub, a switch, a bridge, a network interface card (NIC), an optical add-drop multiplexer (OADM), an Ethernet device, an Ethernet back haul (EBH) device, or the like. Network device 210 may communicate with one or more other devices (e.g., another network device 210, etc.) based on a computer networking protocol (e.g., the Ethernet protocol, the Synchronous Optical Networking (SONET) protocol, the Synchronous Digital Hierarchy (SDH) protocol, etc.).

Network management device 220 may include one or more devices capable of storing, processing, and/or routing information. For example, network management device 220 may include a computing device, such as a desktop computer, a laptop computer, a tablet computer, a server, or the like. In some implementations, network management device 220 may include a communication interface that allows network management device 220 to receive information from and/or transmit information to other devices in environment 200 (e.g., network device 210, etc.).

Network 230 may include one or more wired and/or wireless networks. For example, network 230 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
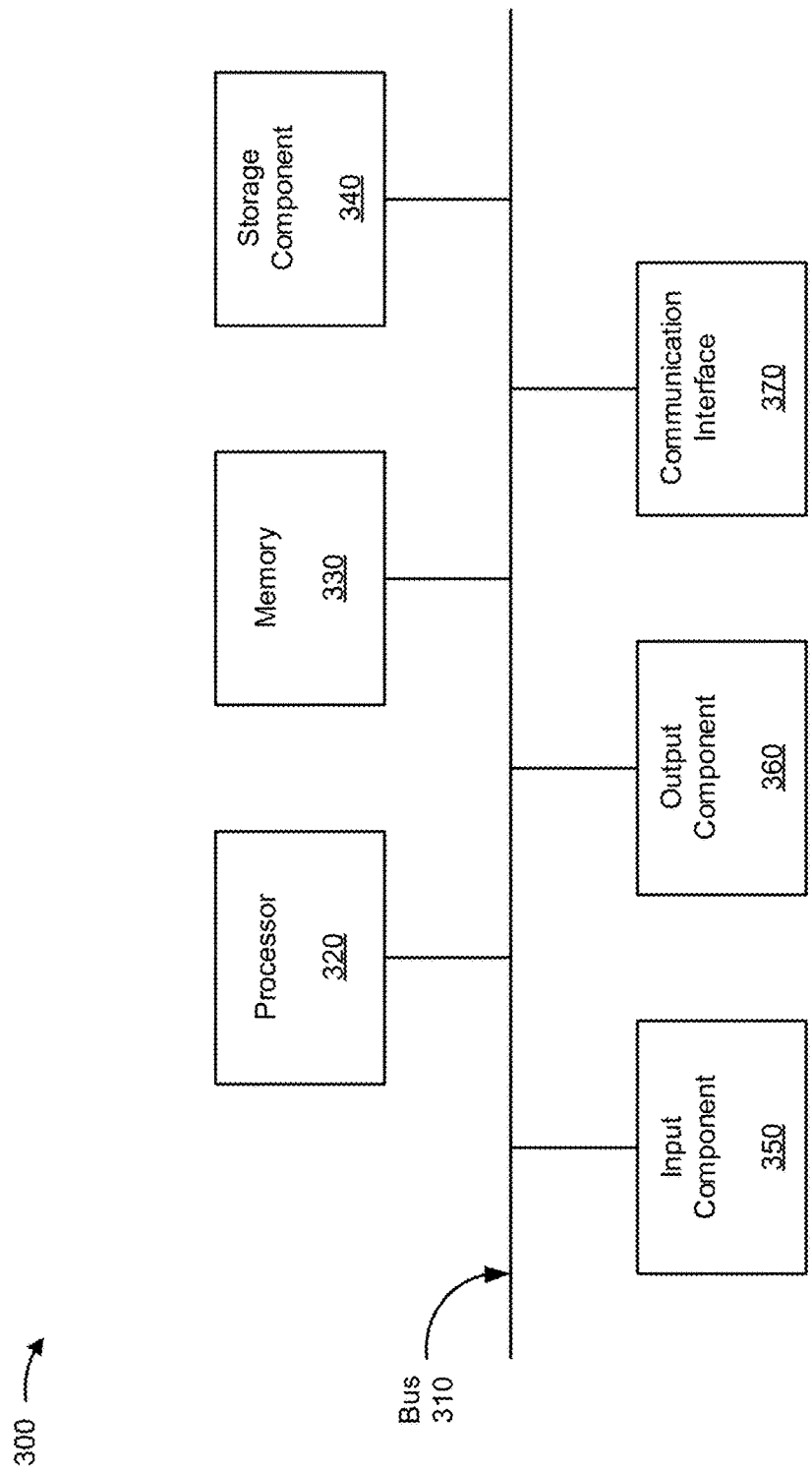
FIG. 3 is a diagram of example components of one or more devices of FIG. 2.

FIG. 3 is a diagram of example components of a device 300. Device 300 may correspond to network device 210 and/or network management device 220. In some implementations, network device 210 and/or network management device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
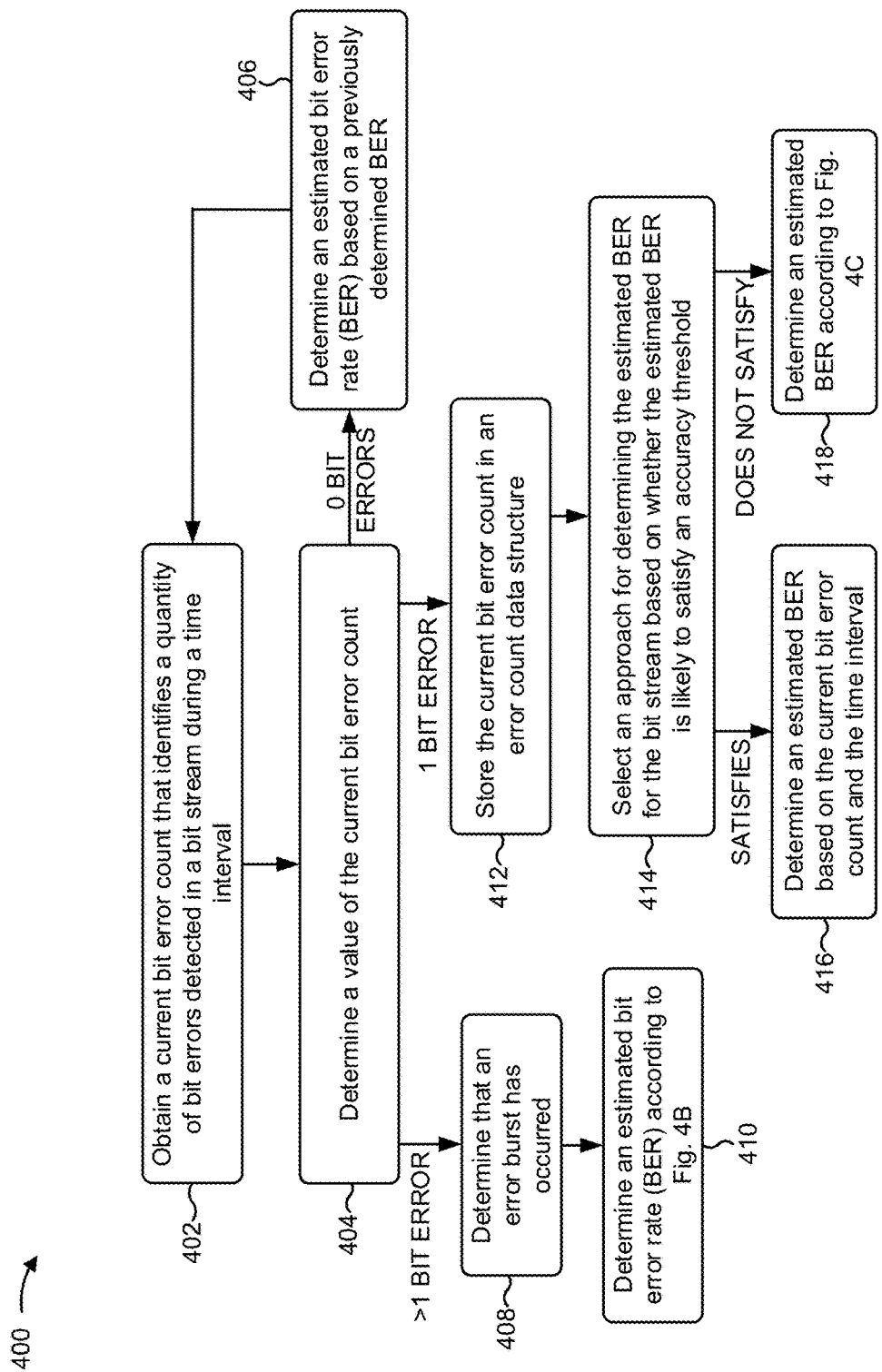
FIGS. 4A-4C are flow charts of an example process for determining an estimated bit error rate.
Figure 4B:
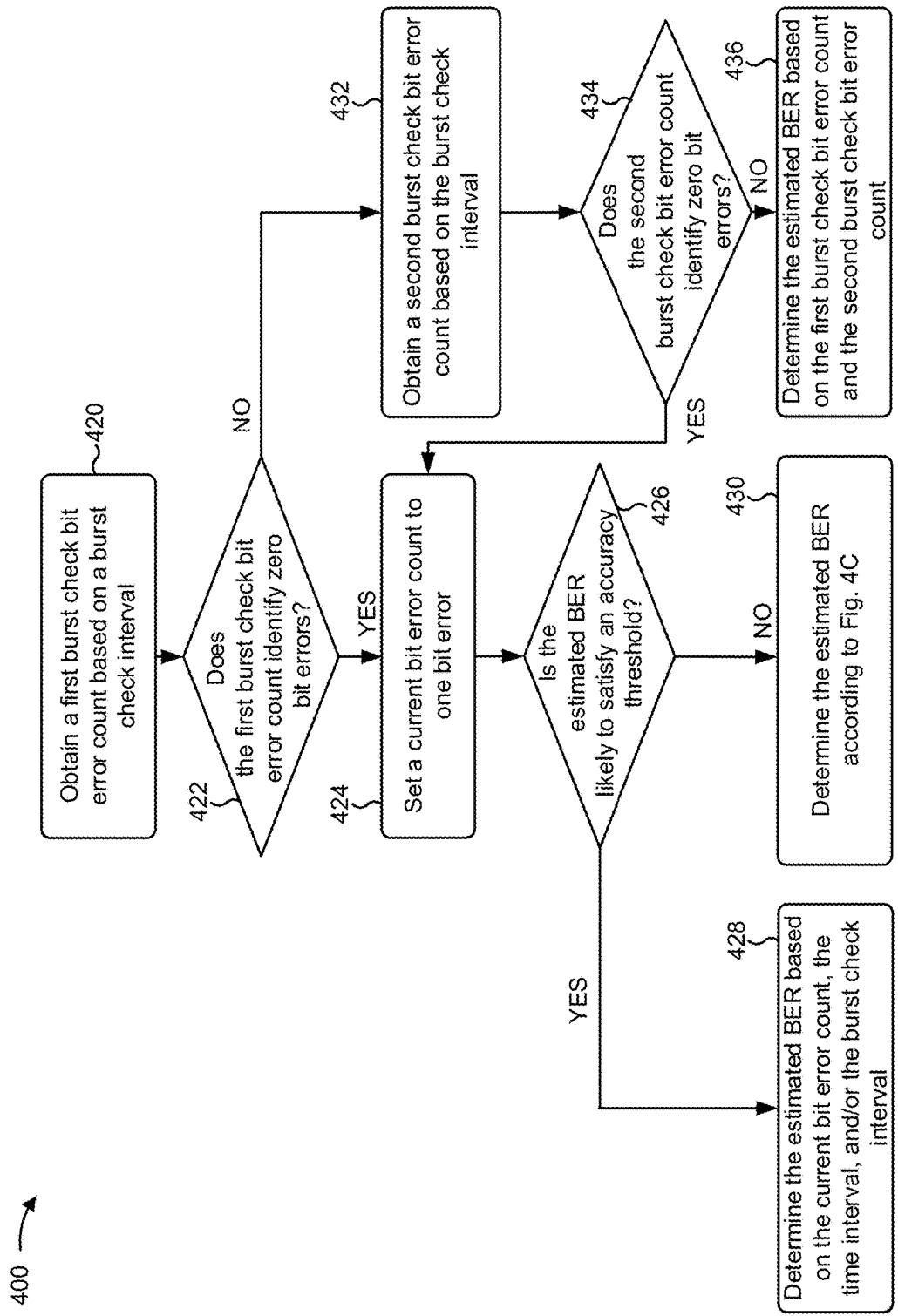
Figure 4C:
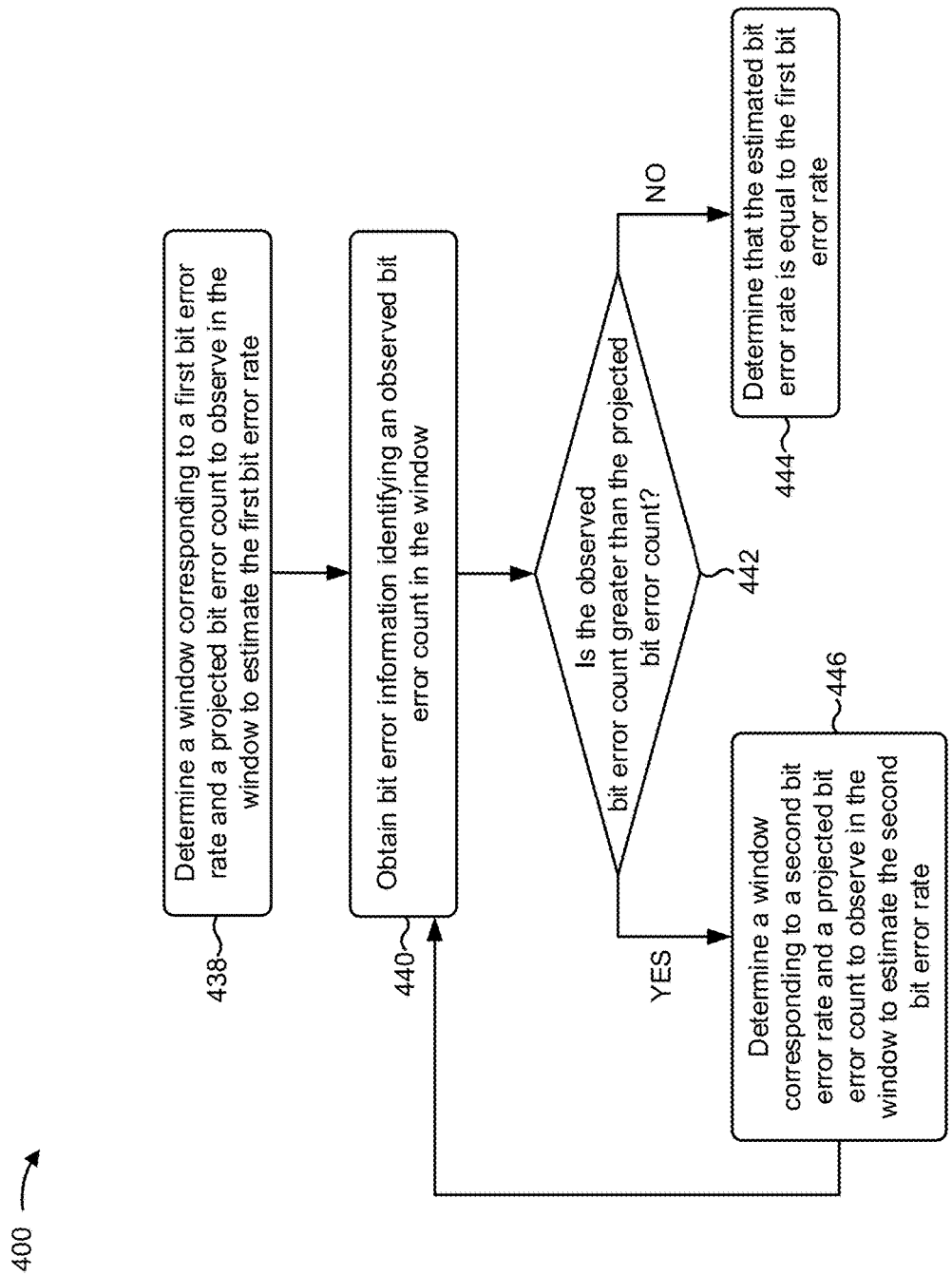

FIGS. 4A-4C are flow charts of an example process 400 for determining an estimated bit error rate. In some implementations, one or more process blocks of FIGS. 4A-4C may be performed by network device 210. Additionally, or alternatively, one or more process blocks of FIGS. 4A-4C may be performed by another device or a group of devices separate from or including network device 210, such as network management device 220.

As shown in FIG. 4A, process 400 may include obtaining a current bit error count that identifies a quantity of bit errors detected in a bit stream during an interval (block 402). For example, network device 210 may receive a bit stream from another network device 210. Network device 210 may detect bit errors in the bit stream, and may log information identifying a quantity of the bit errors detected. Network device 210 may obtain a current bit error count that identifies the quantity of bit errors detected in an interval. For example, network device 210 may obtain the current bit error count at an interval that has a time span equal to the interval, on demand after the interval has elapsed, or the like.

In some implementations, network device 210 may obtain multiple error counts, and may determine the current bit error count based on the multiple error counts. For example, network device 210 may obtain one or more of: a Physical Coding Sublayer (PCS) block error count, as described in Institute of Electrical and Electronics Engineers (IEEE) standard 802.3ae register field 3.33.7:0, IEEE standard 802.3ba register field 3.33.7:0, and/or IEEE standard 802.3ba register field 3.45.13:0; a PCS BER count, as described in IEEE standard 802.3ae register field 3.33.13:8, IEEE standard 802.3ba register field 3.33.13:8, and/or IEEE standard 802.3ba register field 3.44.15:0; a media access control frame check sequence error count; a virtual lane bit-interleaved-parity-(BIP)-8 error count; a B1 byte BIP error count; a B2 byte BIP error count; a B3 byte BIP error count; a remote error indication error count; a forward error correction (FEC) corrected block counter, as described in IEEE standard 802.3ba register fields 1.172 and 1.173; an FEC uncorrected block counter, as described in IEEE standard 802.3ba register field 1.174 and 1.175; or another type bit error count.

Network device 210 may, for example, determine a maximum error count from two or more obtained error counts, and may use the maximum error count as the current bit error count. By taking the maximum error count, network device 210 reduces a quantity of bit errors counted by two or more of the error counts, which improves accuracy of the estimated BER. In some implementations, network device 210 may perform another operation to obtain the current bit error count, such as using a sum of two or more error counts, using an average of two or more error counts, using a mean of two or more error counts, using a median of two or more error counts, using a minimum of two or more error counts, or the like.

In some implementations, network device 210 may store the current bit error count. For example, network device 210 may store a data structure that includes bit error counts and time stamps identifying when the bit error counts were obtained. Network device 210 may add the current bit error count, and a time identifier identifying when network device 210 obtains the current bit error count, to the data structure. Based on the data structure, network device 210 may determine bit error counts for periods of time other than the particular period, as described in more detail below.

As further shown in FIG. 4A, process 400 may include determining a value of the current bit error count (block 404). For example, network device 210 may determine a value of the current bit error count. In some implementations, network device 210 may estimate an estimated BER, using a particular method, based on the value of the current bit error count, as described in more detail below.

As further shown in FIG. 4A, if the current bit error count identifies zero bit errors, (block 404—0 BIT ERRORS), process 400 may include determining an estimated BER based on a previously determined BER (block 406). For example, when the current bit error count identifies zero bit errors, network device 210 may determine the estimated BER based on a previously determined BER, such as an estimated BER for a time interval preceding the interval, a default estimated BER, or the like. Network device 210 may perform an action based on whether the estimated BER satisfies a threshold value, as described in more detail in connection with FIG. 5, below.

As further shown in FIG. 4A, if the current bit error count identifies more than one bit error (block 404—>1 BIT ERROR), process 400 may include determining that an error burst has occurred (block 408). For example, when the current bit error count identifies multiple bit errors in the interval, network device 210 may determine that an error burst has occurred. An error burst may include multiple bit errors that are potentially interrelated. For example, an error burst may be associated with a line cut scenario, a network reconfiguration, or the like, which may cause multiple bit errors to occur.

As further shown in FIG. 4A, process 400 may include determining an estimated BER according to FIG. 4B (block 410). For example, network device 210 may determine an estimated BER according to a process described in connection with FIG. 4B. FIG. 4B describes a process for determining whether an error burst has concluded based on one or more error burst bit error counts that are performed after the current bit error count is obtained. In some implementations, network device 210 may store the current bit error count and/or a time stamp identifying when the current bit error count was obtained (e.g., in an error count data structure, etc.). Additionally, or alternatively, network device 210 may set a value of the current bit error count to one bit error, and may store the current bit error count of one bit error. In this way, network device 210 may prevent an error burst from reducing accuracy of subsequent estimated BER values.

As further shown in FIG. 4A, if the current bit error count identifies one bit error (block 404—1 BIT ERROR), process 400 may include storing the current bit error count in an error count data structure (block 412). For example, network device 210 may store the current bit error count in an error count data structure. In some implementations, network device 210 may associate the current bit error count with a time stamp that identifies a time when network device 210 obtained the current bit error count.

As further shown in FIG. 4A, process 400 may include selecting an approach for determining the estimated BER for the bit stream based on whether the estimated BER is likely to satisfy an accuracy threshold (block 414). For example, network device 210 may select an approach for determining the estimated BER. Network device 210 may select the approach based on whether the estimated BER is likely to satisfy an accuracy threshold associated with the bit stream. The accuracy threshold may identify a BER. When the estimated BER is above the BER identified by the accuracy threshold (i.e., when network device 210 detects errors more frequently than the BER identified by the accuracy threshold), network device 210 may determine the estimated BER based on a first approach (e.g., as described in connection with block 416, below). When the estimated BER is not above the BER identified by the accuracy threshold (i.e., when bit errors in the bit stream are sparser than the BER identified by the accuracy threshold, network device 210 may determine the estimated BER based on a second approach (e.g., a sliding window approach, as described in connection with block 418, and in more detail in connection with FIG. 4C, below).

Network device 210 may determine whether the estimated BER is likely to satisfy the accuracy threshold. In some implementations, network device 210 may determine whether the estimated BER is likely to satisfy the accuracy threshold based on stored information. For example, network device 210 may determine that previous estimated BERs, associated with the bit stream and/or network device 210, satisfied (or did not satisfy) the accuracy threshold, and may select the approach accordingly. In this way, network device 210 conserves processor resources by reducing a quantity of operations required to determine whether the estimated BER is likely to satisfy the accuracy threshold.

In some implementations, network device 210 may determine whether the estimated BER is likely to satisfy the accuracy threshold based on a testing window. For example, network device 210 may select a testing window based on the BER identified by the accuracy threshold. Network device 210 may select the testing window based on a statistical analysis, as described in more detail in connection with FIG. 4C, below. Network device 210 may determine an observed bit error count identifying a quantity of bit errors that have occurred in the testing window (e.g., based on an error count data structure), and may determine whether the estimated BER is likely to satisfy the accuracy threshold based on the observed bit error count.

For example, if the observed bit error count in the testing window exceeds an expected bit error count for the testing window, network device 210 may determine that the estimated BER is likely to satisfy the accuracy threshold (i.e., that the estimated BER is likely to be greater than the BER identified by the accuracy threshold). If the observed bit error count in the testing window does not exceed the expected bit error count, network device 210 may determine that the estimated BER is unlikely to satisfy the accuracy threshold.

As further shown in FIG. 4A, if the estimated BER is likely to satisfy the accuracy threshold (block 414—SATISFIES), process 400 may include determining an estimated BER based on the current bit error count and the time interval (block 416). For example, if the estimated BER is projected to satisfy the accuracy threshold, network device 210 may determine an estimated BER based on the current bit error count and the time interval. In some implementations, network device 210 may combine the current bit error count and a quantity of bits received in the time interval. For example, network device 210 may divide the current bit error count by the quantity of bits received. In this way, network device 210 may determine the estimated BER in situations where bit errors occur with sufficient frequency to permit determination of the estimated BER based on division, which reduces processor resource usage associated with estimating the BER.

As further shown in FIG. 4A, if the estimated BER is not projected to satisfy the accuracy threshold (block 414—DOES NOT SATISFY), process 400 may include determining an estimated BER according to FIG. 4C (block 418). For example, if the estimated BER is not projected to satisfy the accuracy threshold, network device 210 may determine an estimated BER by performing the sliding window approach, as described in more detail in connection with FIG. 4C. Network device 210 may use the sliding window approach in situations where bit errors occur too infrequently to permit network device 210 to accurately determine the estimated BER based on division. In this way, network device 210 improves network resilience by determining an estimated BER. Network device 210 may perform an action based on the estimated BER (e.g., notifying network manager device 220, rerouting network traffic, etc.), as described in more detail in connection with FIG. 5, below.

FIG. 4B describes determining an estimated BER based on detecting an error burst. Network device 210 may perform operations described in connection with FIG. 4B when network device 210 obtains a current bit error count that identifies multiple bit errors, as described in more detail in connection with block 410 of FIG. 4A, above.

As shown in FIG. 4B, process 400 may include obtaining a first burst check bit error count based on a burst check interval (block 420). For example, when the current bit error count includes two or more bit errors, network device 210 may obtain a first burst check bit error count based on a burst check interval. The burst check interval may include an interval (e.g., a quantity of bits, a period of time, etc.) after the current bit error count is obtained. In some implementations, the burst check interval may be shorter than the time interval described in connection with block 402 of FIG. 4A. Network device 210 may obtain the first burst check bit error count to check whether the error burst identified based on the current bit error count has ended.

As further shown in FIG. 4B, process 400 may include determining whether the first burst check bit error count identifies zero bit errors (block 422). For example, network device 210 may determine whether the first burst check bit error count identifies zero bit errors. If the first burst check bit error count identifies zero bit errors, then the current bit error count may not have been obtained in the midst of an error burst. That is, the current bit error count may have been obtained after the error burst ended.

As further shown in FIG. 4B, if the first burst check bit error count identifies zero bit errors (block 422—YES), process 400 may include setting a current bit error count to one bit error (block 424). For example, network device 210 may set the current bit error count to one bit error when the first burst check bit error count identifies zero bit errors. Network device 210 may set the current bit error count to one bit error based on the assumption that multiple bit errors are unlikely to occur in the time interval, and based on the assumption that the multiple bit errors associated with the current bit error count are not statistically independent. Furthermore, network device 210 may set the current bit error count to one bit to ensure that subsequent estimated BERs, that include the current bit error count, are determined accurately.

Network device 210 may determine the estimated BER based on an assumption that bit errors are caused by statistically independent events. When the first bit error count identifies two or more bit errors, and when the first burst check bit error count identifies no bit errors, network device 210 may determine that the bit errors identified by the first bit error count are associated with an error burst. When the bit errors identified by the first bit error count are associated with an error burst, network device 210 may set the first bit error count to one bit error. In this way, network device 210 improves accuracy of the estimated BER by treating error bursts as one bit error based on the bit errors of the error burst being statistically related.

As further shown in FIG. 4B, process 400 may include determining whether the estimated BER is likely to satisfy an accuracy threshold (block 426). For example, network device 210 may determine whether the estimated BER is likely to satisfy an accuracy threshold. Network device 210 may determine whether the estimated BER is likely to satisfy the accuracy threshold as described in more detail in connection with block 414 of FIG. 4A, above.

As further shown in FIG. 4B, if the estimated BER is likely to satisfy the accuracy threshold (block 426—YES), process 400 may include determining the estimated BER based on the current bit error count, the time interval, and/or the burst check interval (block 428). For example, network device 210 may determine the estimated BER based on the current bit error count, the time interval, and/or the burst check interval. In some implementations, network device 210 may combine the current bit error count, a quantity of bits associated with the time interval, and a quantity of bits associated with the burst check interval. For example, network device 210 may divide the current bit error count (e.g., 1) by a sum of the quantity of bits associated with the time interval and the burst check interval to determine the estimated BER. In this way, network device 210 conserves processor resources by reducing a quantity of operations required to determine the estimated BER.

As further shown in FIG. 4B, if the estimated BER is not likely to satisfy the accuracy threshold (block 426—NO), process 400 may include determining the estimated BER according to FIG. 4C (block 430). For example, when the estimated BER is not likely to satisfy the accuracy threshold, network device 210 may determine that the estimated BER is too low to estimate based on bit error counts in the burst check intervals. Accordingly, network device 210 may determine the estimated BER by performing the sliding window method, as described in more detail in connection with FIG. 4C.

As further shown in FIG. 4B, when the first burst check bit error count does not identify zero bit errors (block 422—NO), process 400 may include obtaining a second burst check bit error count based on the burst check interval (block 432). For example, when the first burst check bit error count identifies one or more bit errors, network device 210 may obtain a second burst check bit error count. Network device 210 may obtain the second burst check bit error count to determine whether the first burst check bit error count was obtained during an error burst. Network device 210 may obtain the second burst check bit error count based on the burst check interval. For example, if the burst check interval is 25 milliseconds (ms), network device 210 may obtain the second burst check bit error count 25 ms after obtaining the first burst check bit error count, which may be obtained 25 ms after obtaining the current bit error count.

As further shown in FIG. 4B, process 400 may include determining whether the second burst check bit error count identifies zero bit errors (block 434). For example, network device 210 may determine whether the second burst check bit error count identifies zero bit errors. When the second burst check bit error count does not identify zero bit errors (block 434—NO), process 400 may include determining the estimated BER based on the first burst check bit error count and the second burst check bit error count (block 436). For example, when the second burst check bit error count identifies one or more bit errors, network device 210 may determine the estimated BER by combining the first burst check bit error count, the second burst check bit error count, and a quantity of bits received in association with the first burst check bit error count and the second burst check bit error count (e.g., by dividing the sum of the first burst check bit error count and the second burst check bit error count by the quantity of bits received).

As further shown in FIG. 4B, if the second burst check bit error count identifies zero bit errors (block 434—YES), process 400 may include performing operations described in connection with blocks 424-430. For example, when the second burst check bit error count identifies zero bit errors, network device 210 may set a value of the first bit error count to one bit error, and may determine a burst check BER based on the current bit error count. That is, network device 210 may determine whether the estimated BER is likely to satisfy the accuracy threshold (e.g., as shown in connection with block 426), and if the estimated BER is not likely to satisfy the accuracy threshold, network device 210 may determine the estimated BER based on the sliding window approach, as described in connection with FIG. 4C (e.g., as shown in block 430).

Alternatively, if the estimated BER is likely to satisfy the accuracy threshold, network device 210 may determine the estimated BER based on the current bit error count, the interval, and the burst check interval (e.g., as shown in block 428). For example, network device 210 may divide the current bit error count (e.g., 1) by a quantity of bits received in the interval and the burst check interval. In this way, network device 210 may determine an estimated BER based on division, which conserves processor resources.

FIG. 4C describes determining an estimated BER based on sliding windows. Network device 210 may perform the operations described in FIG. 4C when an estimated BER is unlikely to satisfy an accuracy threshold. That is, network device 210 may perform the operations described in connection with FIG. 4C when dividing a quantity of observed bit errors by a quantity of bits received while observing the bit errors is unlikely to provide an accurate estimated BER.

As shown in FIG. 4C, process 400 may include determining a window corresponding to a first bit error rate and a projected quantity of bit errors to observe in the window to estimate the first bit error rate (block 438). For example, network device 210 may determine a window corresponding to a first BER and a projected quantity of bit errors to observe in the window to estimate the first BER.

In some implementations, the window may be defined based on an amount of time (e.g., one minute, five minutes, one day, etc.). Additionally, or alternatively, the window may be defined based on a quantity of bits received in the inbound bit stream (e.g., $10^{10}$ bits, $10^{14}$ bits, etc.). Network device 210 may convert the window between time-based units and a quantity of bits based on a bit rate of the bit stream. For example, when the bit stream includes $10^5$ bits per second and the window includes $10^6$ bits, the window includes 10 seconds.

Network device 210 may determine the window based on the first BER threshold and based on a level of confidence. For example, network device 210 may determine the window based on the following equation 1:

$$N = \left(\frac{1}{BER}\right) * \left[-\ln(1-C) + \ln\left(\sum_{k=0}^{E} \frac{(N*BER)^k}{k!}\right)\right]. \quad \text{Equation 1}$$

Here, the window is of length N. The BER associated with the window is represented by BER, and the level of confidence is represented by C. A projected bit error count is represented by E.

The level of confidence may include values such as 50%, 68%, 90%, 95%, 99%, or the like. When an observed bit error count for a testing window of length N exceeds the projected bit error count (E), network device 210 may determine, at a level of confidence of C, that an estimated BER exceeds BER. As an example, consider Table 1, below:

TABLE 1

| C | N*BER |
|---|---|
| 90% | 5.32 |
| 95% | 6.30 |
| 99% | 8.40 |

Table 1 shows values of N*BER, determined at a value of E=2, for different values of C. Here, for example, assume that the first BER is $10^{-12}$, assume that C=90%, and assume that E=2. In that case, the window (e.g., N) is determined to be $5.32*10^{12}$ bits. When an observed bit error count for the window of $5.32*10^{12}$ bits is greater than E (e.g., greater than 2), network device 210 determines, with 90% confidence, that the estimated BER for the window is greater than BER (e.g., $10^{-12}$), and thus that the estimated BER is greater than the first BER.

In some implementations, network device 210 may use a lower confidence level (e.g., 50%), which may shorten the testing window. By shortening the testing window, network device 210 reduces time and processing resources required to determine the estimated BER. In some implementations, network device 210 may use a higher confidence level (e.g., 99%), which may lengthen the testing window. By lengthening the testing window, network device 210 determines the estimated BER at a higher level of confidence, and thus improves accuracy of the estimated BER.

As further shown in FIG. 4C, process 400 may include obtaining bit error information identifying an observed bit error count in the window (block 440). For example, network device 210 may obtain bit error information identifying an observed bit error count in the window. Network device 210 may obtain the bit error information from a data structure that stores past bit error counts. For example, the data structure may store bit error counts and times at which the bit error counts were obtained, as described in more detail in connection with FIG. 4A, above. Network device 210 may obtain bit error counts, from the data structure, that are within the window. For example, if the window is thirty seconds in length, network device 210 may obtain bit error counts from the data structure that were obtained within the previous thirty seconds.

As further shown in FIG. 4C, process 400 may include determining whether the observed bit error count is greater than the projected bit error count (block 442). For example, network device 210 may determine whether the observed bit error count is greater than the projected bit error count. When the observed bit error count is not greater than the projected bit error count (block 442—NO), process 400 may include determining that the estimated bit error rate is equal to the first bit error rate (block 444). For example, when the observed bit error count is not greater than the projected bit error count (e.g., E, as shown in Equation 1, above), network device 210 may determine that the estimated BER is equal to the first BER.

In some implementations, network device 210 may set the window based on a relatively low BER (e.g., $10^{-16}$, as compared with a relatively high BER, such as $10^{-10}$). If the observed bit error count, in the window corresponding to the first BER of $10^{-16}$, is not greater than the projected bit error count, network device 210 may determine that the estimated BER is equal to $10^{-16}$.

As further shown in FIG. 4, if the observed bit error count is greater than the projected bit error count (block 442—YES), process 400 may include determining a window corresponding to a second bit error rate and a projected bit error count to observe in the window to estimate the second bit error rate and/or returning to block 440 (block 446). For example, in the above example with the first BER of $10^{-16}$, assume instead that the observed bit error count exceeds the projected bit error count. In that case, network device 210 may determine a second bit error rate (e.g., $10^{-15}$, as one possible example), may determine a window corresponding to the second bit error rate (e.g., based on Equation 1), and may determine a projected bit error count to observe in the window (e.g., E). The window corresponding to the BER of $10^{-15}$ may be of a shorter length than the window corresponding to the BER of $10^{-16}$ based on Equation 1. For example, assuming a level of confidence of 90% and E of 2, the window corresponding to the BER of $10^{-16}$ may include $5.32*10^{16}$ bits, and the window corresponding to the BER of $10^{-15}$ may include $5.32*10^{15}$ bits.

Continuing the above example, network device 210 may obtain bit error information identifying an observed bit error count in the window corresponding to the BER of $10^{-15}$, as described in connection with block 440. Network device 210 may determine whether the observed bit error count is greater than the projected bit error count. When the observed bit error count is not greater than the projected bit error count, network device 210 may determine that the estimated BER is equal to the second BER of $10^{-15}$, as described in connection with block 446.

When the observed bit error count is greater than the projected bit error count (e.g., as shown in block 444), network device 210 may determine yet another window corresponding to a third bit rate (e.g., $10^{-14}$), and may perform the operations described above. In this way, network device 210 checks progressively shorter windows, corresponding to progressively higher BERs, to determine the estimated BER. This permits network device 210 to estimate the BER based on past bit error counts, which permits network device 210 to determine the estimated BER when bit errors occur too infrequently to estimate based on division.

Although FIGS. 4A-4C show example blocks of process 400, in some implementations, process 400 may include additional blocks, fewer blocks, different blocks, or differently arranged blocks than those depicted in FIGS. 4A-4C. Additionally, or alternatively, two or more of the blocks of process 400 may be performed in parallel.

Figure 5:
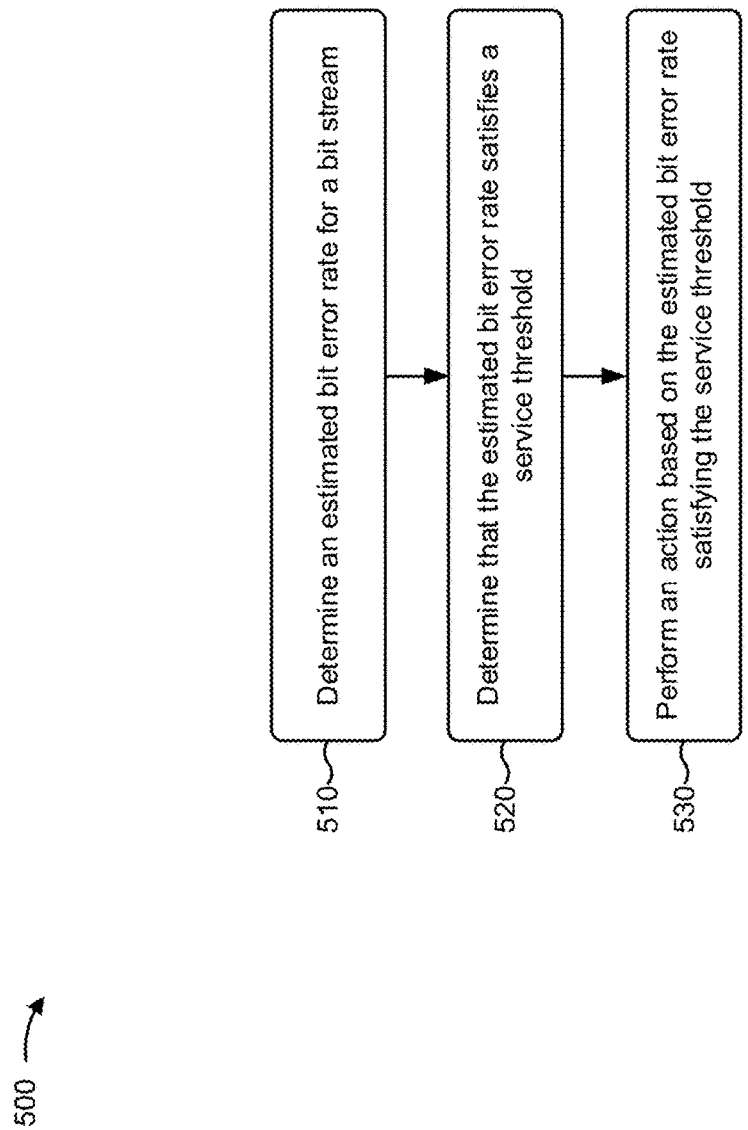
FIG. 5 is a flow chart of an example process for performing an action based on an estimated bit error rate.

FIG. 5 is a flow chart of an example process 500 for performing an action based on an estimated bit error rate. In some implementations, one or more process blocks of FIG. 5 may be performed by network device 210. Additionally, or alternatively, one or more process blocks of FIG. 5 may be performed by another device or a group of devices separate from or including network device 210, such as network manager device 220.

As shown in FIG. 5, process 500 may include determining an estimated bit error rate for a bit stream (block 510). For example, network device 210 may determine an estimated BER for a bit stream. Network device 210 may perform operations described in connection with FIGS. 4A-4C to determine the estimated BER. For example, network device 210 may determine the estimated BER by dividing a quantity of bit errors detected by a quantity of bits received, as described in connection with FIG. 4B, or by performing the sliding window approach described in connection with FIG. 4C.

As further shown in FIG. 5, process 500 may include determining that the estimated bit error rate satisfies a service threshold (block 520). For example, network device 210 may determine that the estimated BER satisfies a service threshold. The service threshold may be a BER corresponding to a particular level of network service degradation, a particular quality of service (QoS), or the like. Network device 210 may determine that the estimated BER satisfies the service threshold.

As further shown in FIG. 5, process 500 may include performing an action based on the estimated bit error rate satisfying the service threshold (block 530). For example, network device 210 may perform an action based on the estimated BER satisfying the service threshold. In some implementations, network device 210 may provide information to another device. For example, network device 210 may provide information to network management device 220 indicating that the estimated BER satisfies the service threshold. Network management device 220 may, in some implementations, reroute network traffic away from network device 210, reconfigure network device 210, or the like. In some implementations, network device 210 may reroute the bit stream to another network device 210.

In some implementations, network device 210 may disrupt the bit stream to cause network device 210 to provide a link failure state indication. For example, network device 210 may be hardcoded to notify another network device 210 and/or network management device 220 of a degraded service when network device 210 detects a certain BER (e.g., $10^{-4}$, as in the Ethernet protocol) by providing a link failure state indication. However, the service threshold may be lower than the certain BER (e.g., $10^{-6}$, $10^{-10}$, etc.). When network device 210 detects an estimated BER that exceeds the service threshold and does not exceed the certain BER, network device 210 may disrupt the bit stream to cause the BER, of the bit stream, to exceed the certain BER. In such a case, network device 210 may detect that the BER exceeds the certain BER and may provide a link failure state indication to the other device. In this way, network device 210 may provide a link failure state indication to another device based on a hardcoded BER threshold, which permits network device 210 to notify the other device without being programmed to transmit a system message to notify the other device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6F are diagrams of an example implementation 600 relating to example processes 400 and 500 shown in FIGS. 4A-4C and FIG. 5. FIGS. 6A-6F show an example of determining an estimated BER and performing an action based on the estimated BER.

Figure 6A:
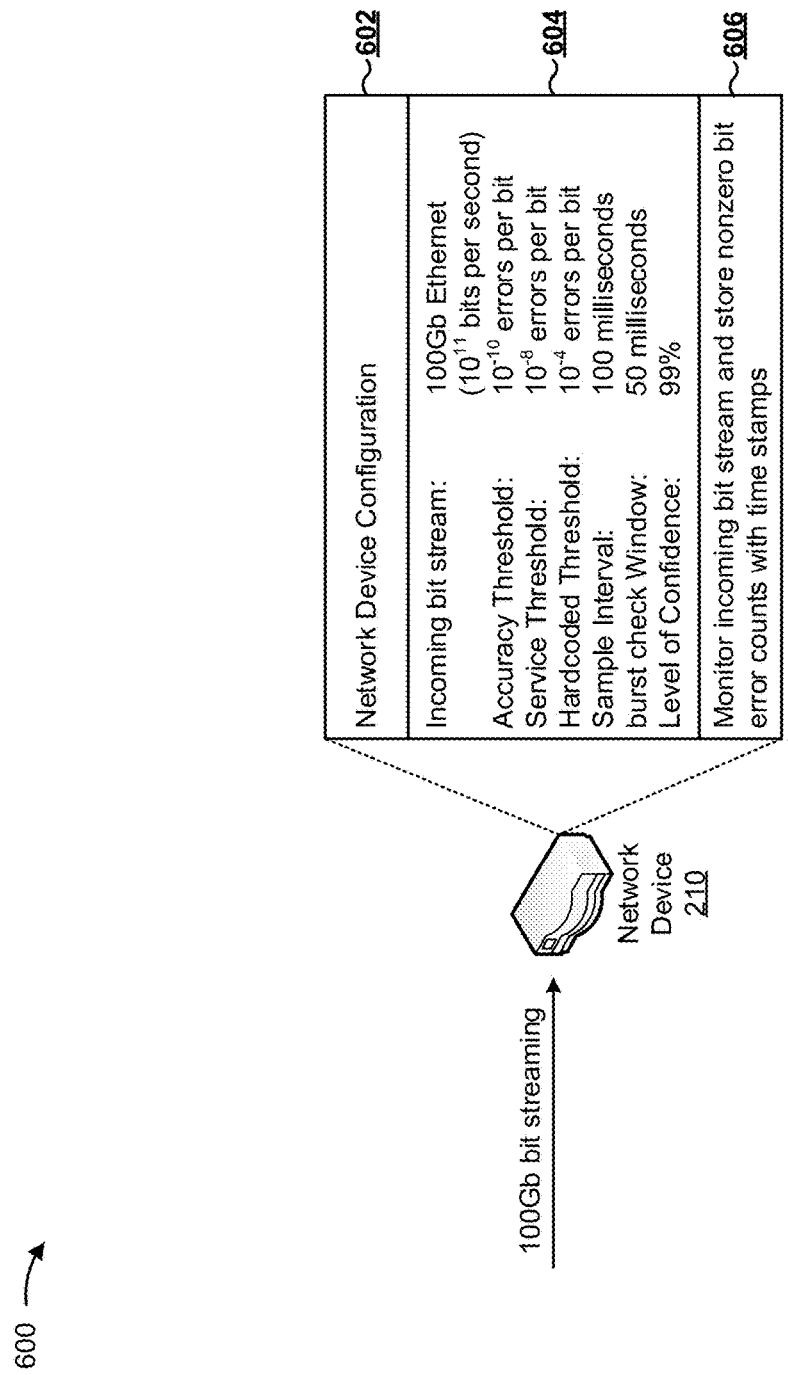
FIGS. 6A-6F are diagrams of an example implementation relating to the example processes shown in FIGS. 4A-4C and FIG. 5.

As shown in FIG. 6A, and by reference number 602, network device 210 may be associated with a network device configuration. As shown by reference number 604, the network device configuration may identify an incoming bit stream (e.g., a 100 Gb stream of $10^{11}$ bits per second). As further shown, the network device configuration may identify an accuracy threshold (e.g., $10^{-10}$ errors per bit). When the estimated BER is not likely to satisfy the accuracy threshold, network device 210 may determine the estimated BER based on a sliding window approach, as described in connection with FIG. 4C. When the estimated BER is likely to satisfy the accuracy threshold, network device 210 may determine an estimated BER based on dividing a quantity of bit errors detected by a quantity of bits received and/or based on one or more burst check bit error counts.

As further shown, the network device configuration identifies a service threshold (e.g., $10^{-8}$ errors per bit). The service threshold may identify, for example, a particular bit error rate at which a network service that is routed via network device 210 is degraded.

As further shown, the network device configuration identifies a hardcoded threshold (e.g., 10 errors per bit). When network device 210 detects a BER that satisfies the hardcoded threshold, network device 210 may automatically cause the incoming bit stream to be rerouted to another network device 210 and may provide a link failure state indication. As further shown, the network device configuration identifies an interval and a burst check interval (e.g., 100 milliseconds (ms) and 50 ms, respectively). Network device 210 may obtain bit error counts every 100 ms based on the interval. When network device 210 detects an error burst in a particular bit error count (e.g., based on detecting several bit errors in a particular interval), network device 210 may obtain one or more burst check bit error counts 50 ms after obtaining the particular bit error count.

As further shown, the network device configuration identifies a level of confidence (e.g., 99%). Network device 210 may determine windows, based on which to determine the estimated BER, based on the level of confidence. As shown by reference number 606, network device 210 monitors the incoming bit stream and stores nonzero bit error counts with time stamps identifying when the nonzero bit error counts were obtained.

Figure 6B:
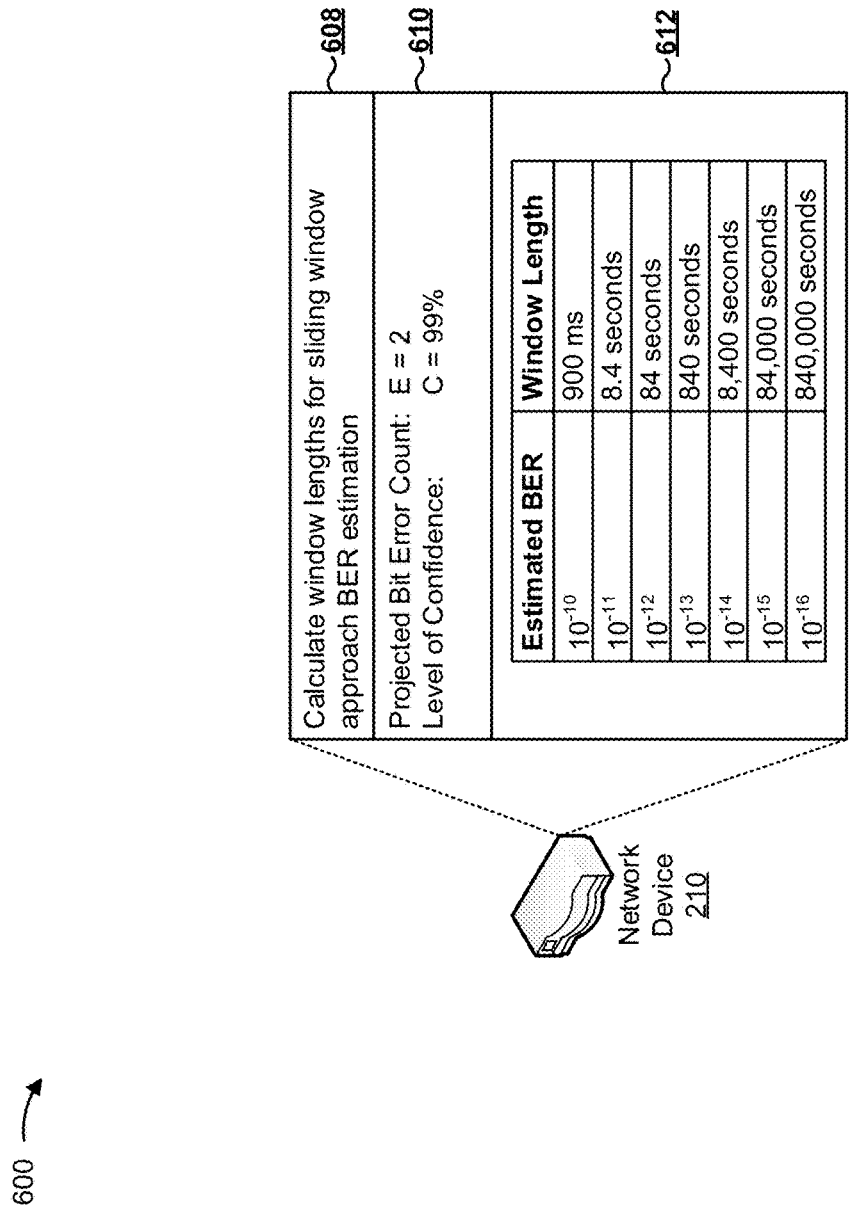

As shown in FIG. 6B, and by reference number 608, network device 210 may calculate window lengths based on which to perform the sliding window approach BER estimation. As shown by reference number 610, network device 210 may calculate the window lengths based on a projected bit error count (e.g., E) of 2 bit errors, and based on the level of confidence (e.g., C) of 99%. Assume that network device 210 calculates the window lengths based on Equation 1, as described in more detail in connection with FIG. 4C, above.

As shown by reference number 612, network device 210 may determine the following window lengths, corresponding to particular estimated BERs:

| Estimated BER | Window Length |
|---|---|
| $10^{-10}$ | 900 ms |
| $10^{-11}$ | 8.4 seconds (s) |
| $10^{-12}$ | 84 s |
| $10^{-13}$ | 840 s |

-continued

| Estimated BER | Window Length |
|---|---|
| $10^{-14}$ | 8,400 s |
| $10^{-15}$ | 84,000 s |
| $10^{-16}$ | 840,000 s |

Figure 6C:
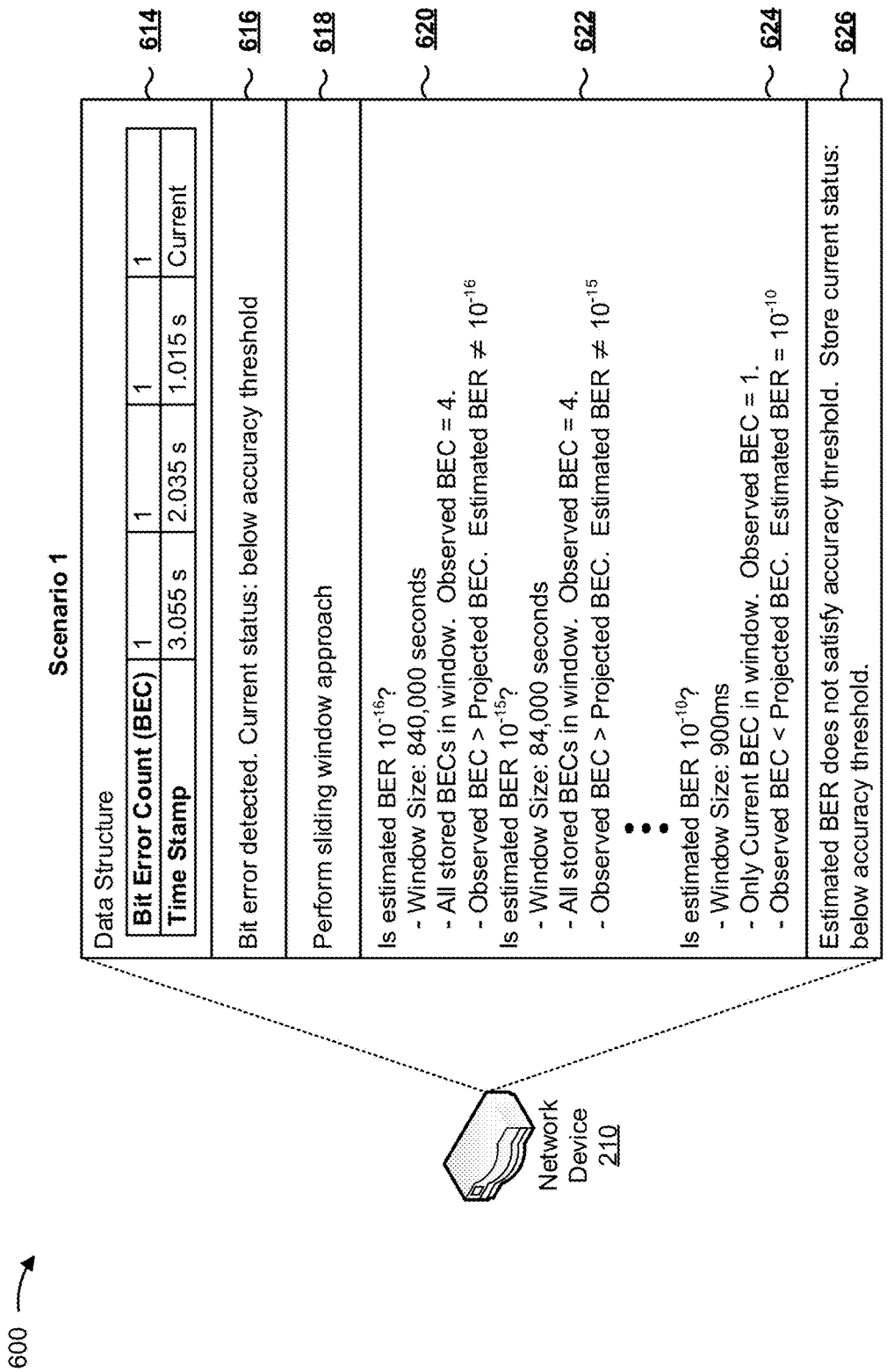

As shown in FIG. 6C (e.g., Scenario 1), and by reference number 614, network device 210 stores a data structure. The data structure identifies bit error counts and time stamps associated with the bit error counts. Here, the bit error counts are associated with time stamps of 3.055 seconds, 2.035 seconds, and 1.015 seconds, indicating that the bit error counts were obtained 3.055 seconds ago, 2.035 seconds ago, and 1.015 seconds ago, respectively. As further shown, the data structure stores a current bit error count. Network device 210 may determine the estimated BER based on the current bit error count identifying a bit error.

As shown by reference number 616, network device 210 may detect a bit error (e.g., in the current bit error count). As further shown, network device 210 may determine that the estimated BER is unlikely to exceed the accuracy threshold (e.g., based on the previously obtained bit error counts being associated with estimated BERs below the accuracy threshold). As shown by reference number 618, based on the estimated BER being unlikely to exceed the accuracy threshold, network device 210 may determine the estimated BER based on the sliding window approach.

As shown by reference number 620, network device 210 may determine whether the estimated BER is equal to $10^{-16}$ errors per bit. As shown, to determine whether the estimated BER is equal to $10^{-16}$ errors per bit, network device 210 may determine a window size corresponding to the BER of $10^{-16}$ errors per bit (e.g., 840,000 seconds, as shown in FIG. 6B). As further shown, network device 210 may determine that each bit error count in the data structure was obtained within the window of 840,000 seconds (e.g., based on the time stamps indicating that the bit error counts were obtained 3.055 seconds ago, 2.035 seconds ago, and 1.015 seconds ago). As further shown, network device 210 may determine an observed bit error count of four bit errors based on the four bit error counts included in the data structure.

As shown, network device 210 may compare the observed bit error count with the projected bit error count (e.g., E=2) and may determine that the observed bit error count is greater than the projected bit error count. Accordingly, network device 210 may determine that the estimated BER is higher than $10^{-16}$ errors per bit.

As shown by reference number 622, network device 210 may determine whether the estimated BER is equal to $10^{-15}$ errors per bit. As shown, to determine whether the estimated BER is equal to $10^{-15}$ errors per bit, network device 210 may determine a window size corresponding to the BER of $10^{-15}$ errors per bit (e.g., 84,000 seconds, as shown in FIG. 6B). As further shown, network device 210 may determine that each bit error count in the data structure was obtained within the window of 84,000 seconds (e.g., based on the time stamps indicating that the bit error counts were obtained 3.055 seconds ago, 2.035 seconds ago, and 1.015 seconds ago). As further shown, network device 210 may determine an observed bit error count of four bit errors based on the four bit error counts included in the data structure.

As shown, network device 210 may compare the observed bit error count with the projected bit error count (e.g., E=2) and may determine that the observed bit error count is greater than the projected bit error count. Accordingly, network device 210 may determine that the estimated BER is higher than $10^{-15}$ errors per bit. Assume that network device 210 performs similar operations for estimated BERs of $10^{-14}$, $10^{-13}$, $10^{-12}$, and $10^{-11}$ errors per bit, and determines that the estimated BER is higher than $10^{-14}$, $10^{-13}$, $10^{-12}$, and $10^{-11}$ errors per bit.

As shown by reference number 624, network device 210 may determine whether the estimated BER is equal to $10^{-10}$ errors per bit. As shown, based on a window size of 900 ms, network device 210 may determine that only the current bit error count is included in the window. As further shown, network device 210 may accordingly determine that the observed bit error count is one bit error. As shown, network device 210 may compare the observed bit error count (e.g., 1) with the projected bit error count (e.g., 2) and may determine that the observed bit error count is not greater than the projected bit error count. Accordingly, network device 210 determines an estimated BER of $10^{-10}$ errors per bit. As shown by reference number 626, network device 210 may store information indicating that the estimated BER does not exceed the accuracy threshold (e.g., for use when another estimated BER is calculated). In this way, network device 210 determines the estimated BER based on the sliding window approach.

Figure 6D:
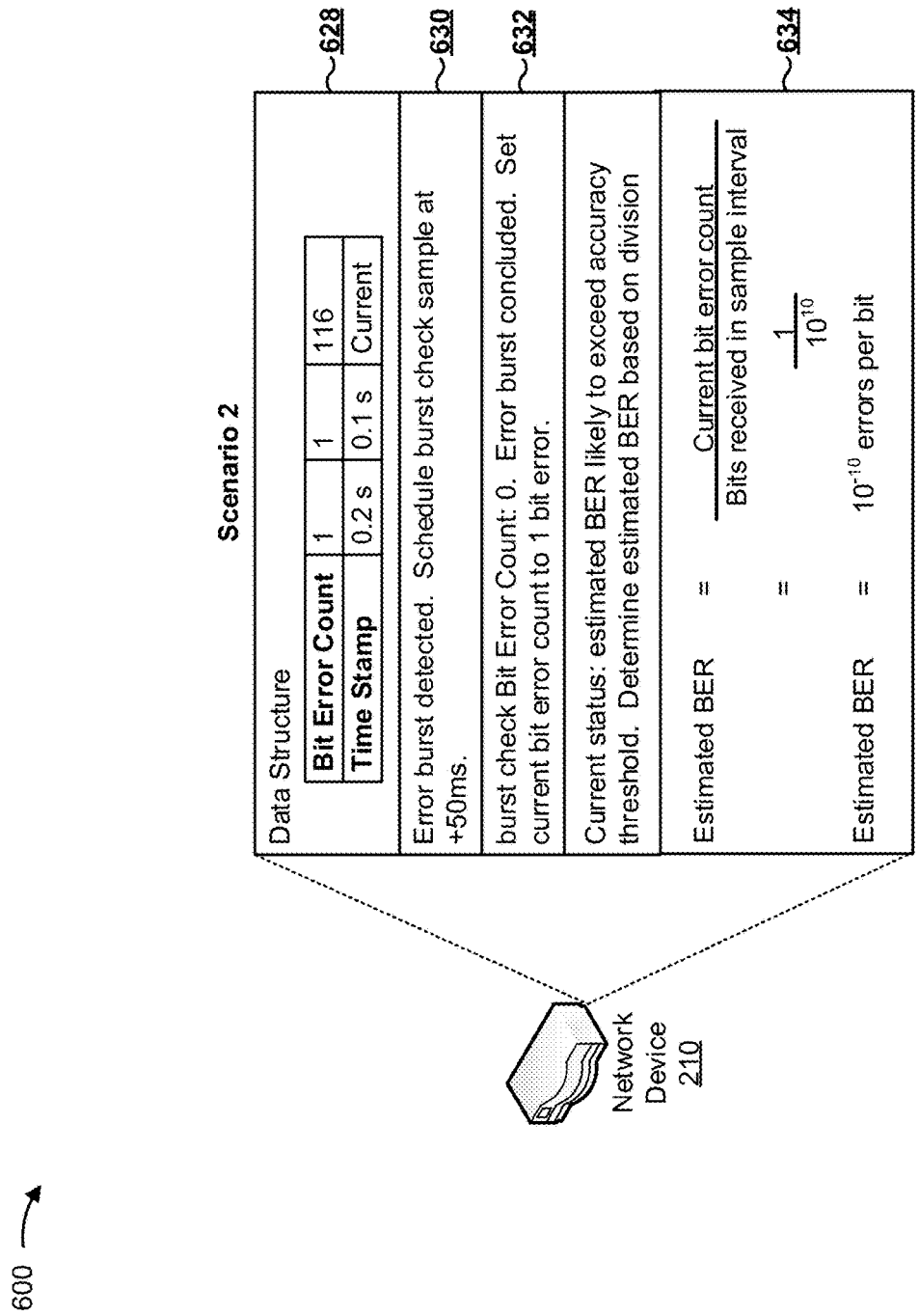

As shown in FIG. 6D (e.g., Scenario 2), and by reference number 628, network device 210 may store a data structure identifying bit error counts and time stamps associated with the bit error counts. Here, a bit error count of 1 bit error is associated with a time stamp of 0.2 seconds, another bit error count of 1 bit error is associated with a time stamp of 0.1 seconds, and a current bit error count of 116 bit errors is associated with a current time stamp. As shown by reference number 630, network device 210 may detect the bit errors identified by the current bit error count, and may determine that the current bit error count identifies an error burst (e.g., based on the current bit error count identifying multiple bit errors). As further shown, network device 210 may obtain a burst check bit error count 50 ms after obtaining the current bit error count (e.g., based on the burst check window).

As shown by reference number 632, network device 210 may obtain a burst check bit error count identifying no bit errors. As further shown, based on the burst check bit error count, network device 210 may determine that the error burst has concluded. As shown, based on the error burst having concluded, network device 210 may set a value of the current bit error count to one bit error. In this way, network device 210 ensures that later estimated BERs are not rendered inaccurate by the error burst. As further shown, network device 210 determines that the estimated BER is likely to exceed the accuracy threshold, and may determine the estimated BER based on division.

As shown by reference number 634, network device 210 may determine the estimated BER by dividing the current bit error count (e.g., 1 bit error) by a quantity of bits received in the interval (e.g., $10^{10}$ bits). As further shown, network device 210 determines an estimated BER of $10^{-10}$ errors per bit. In this way, network device 210 may determine that an error burst has occurred, and may adjust the current bit error count based on the error burst, which improves accuracy of subsequently determined estimated BERs.

Figure 6E:
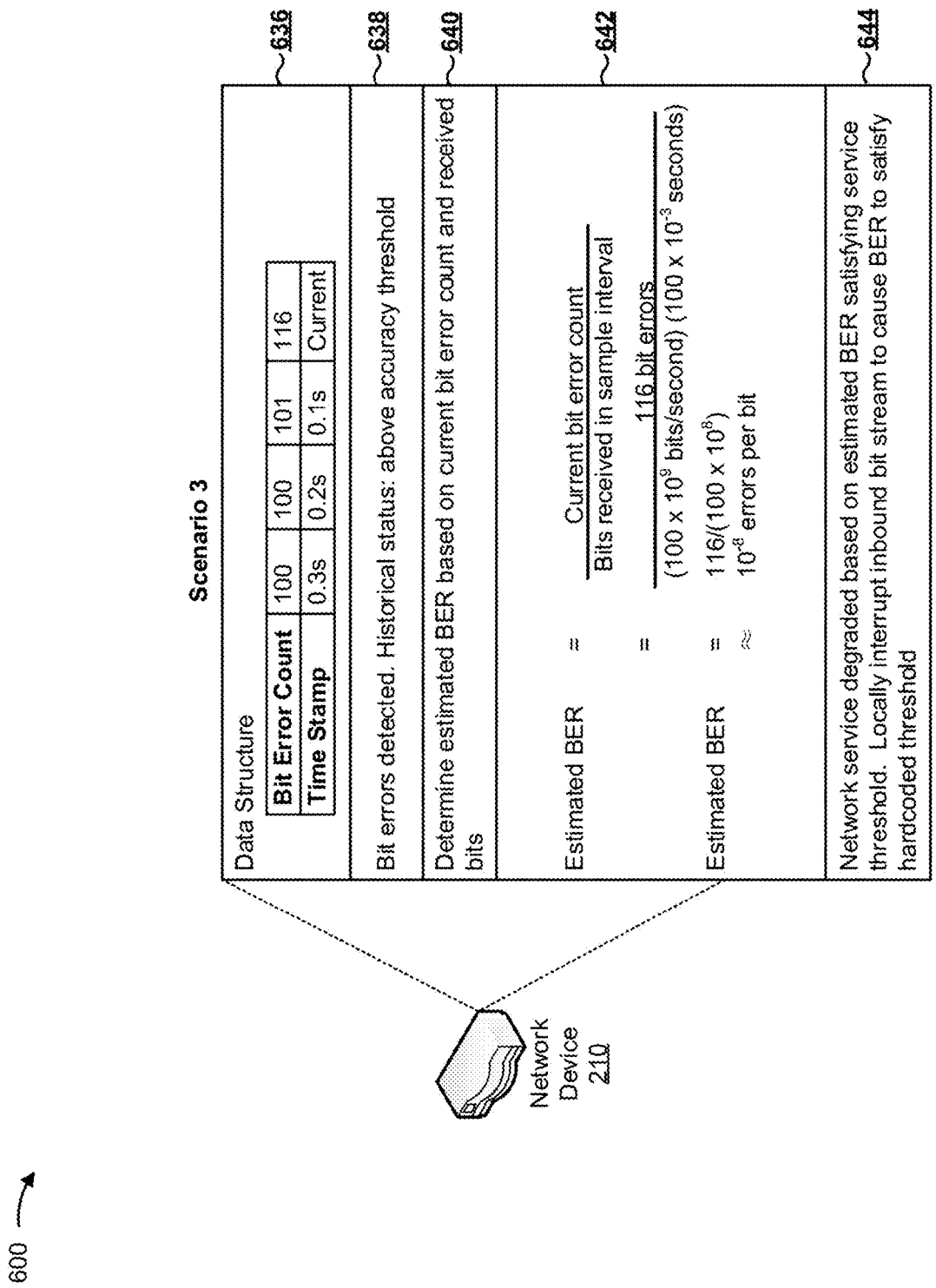

As shown in FIG. 6E (e.g., Scenario 3), and by reference number 636, network device 210 may store a data structure identifying bit error counts and time stamps associated with the bit error counts. Here, a bit error count of 100 bit errors is associated with a time stamp of 0.3 seconds, another bit error count of 100 bit errors is associated with a time stamp of 0.2 seconds, a bit error count of 101 bit errors is associated with a time stamp of 0.1 seconds, and a current bit error count of 116 bit errors is associated with a current time stamp. As shown by reference number 638, network device 210 may detect the bit errors identified by the current bit error count. As further shown, network device 210 may determine that a historical status of network device 210 indicates that the BER associated with network device 210 is historically above the accuracy threshold.

As shown by reference number 640, based on the BER historically being above the accuracy threshold, network device 210 may determine the estimated BER based on the current bit error count and based on a quantity of bits received when determining the current bit error count. In this case, network device 210 may not obtain one or more burst check bit error counts based on the BER associated with network device 210 historically being above the accuracy threshold. For example, bit errors caused by an error burst may be relatively insignificant in relation to the quantity of bit errors identified by the current bit error count.

As shown by reference number 642, network device 210 may determine the estimated BER by dividing the current bit error count (e.g., 116 bit errors) by the quantity of bits received in the 0.1 seconds associated with the current bit error count (e.g., $10^{11}$ bits per second multiplied by 0.1 seconds, or $10^{10}$ bits). As further shown, network device 210 may determine the value of the estimated BER to be roughly $10^{-8}$ errors per bit. As shown by reference number 644, network device 210 may determine that the estimated BER satisfies the service threshold, and may accordingly determine that a network service, associated with the inbound bit stream, is degraded. Based on determining that the network service is degraded, network device 210 may interrupt the inbound bit stream to cause the BER, of the inbound bit stream, to satisfy a hardcoded threshold.

Figure 6F:
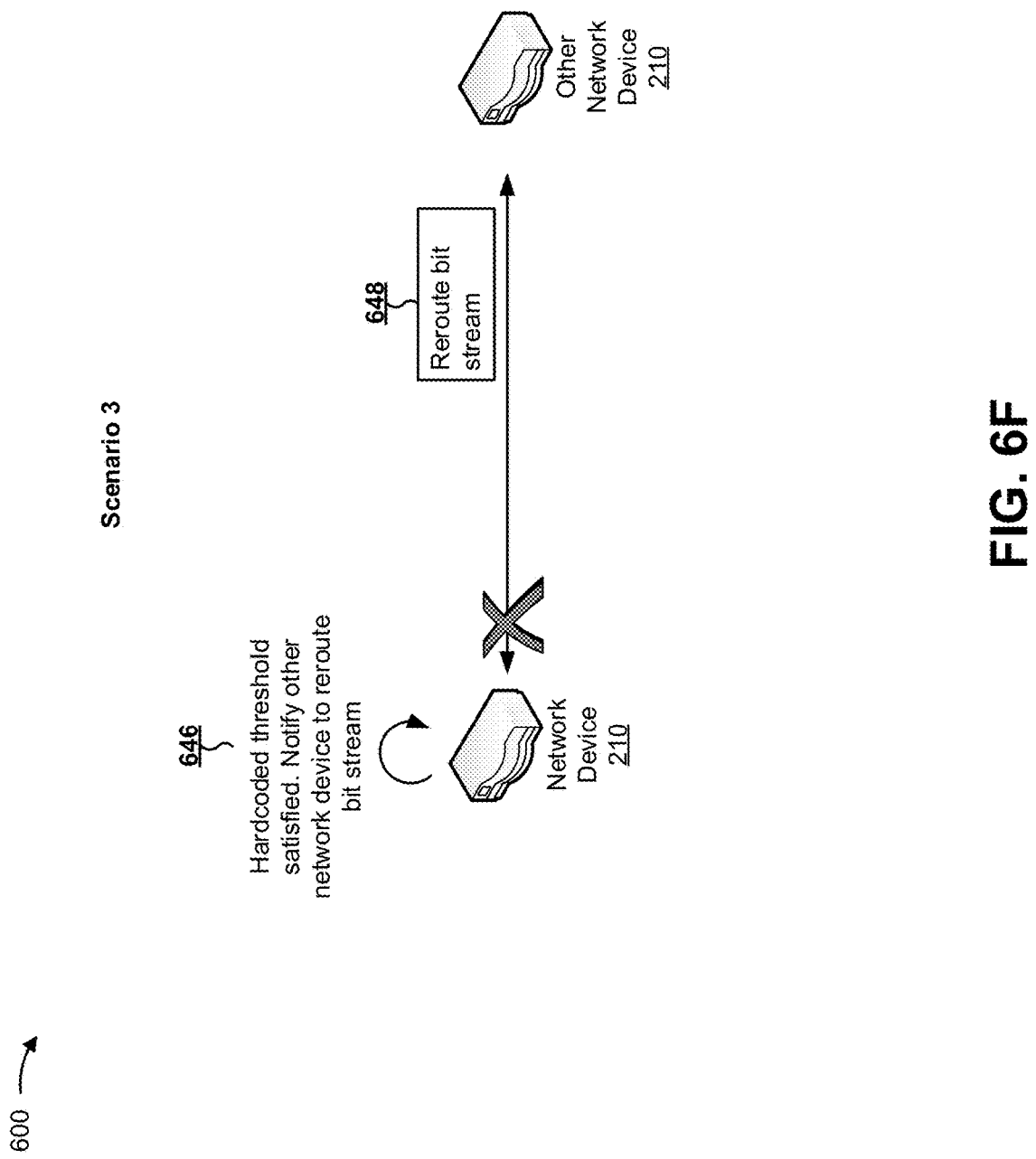

As shown in FIG. 6F, and by reference number 646, network device 210 may determine that the hardcoded threshold is satisfied by the BER of the interrupted bit stream. Network device 210 may further determine to notify another network device 210, that is associated with the inbound bit stream, to reroute the bit stream. As shown by reference number 648, network device 210 notifies the other network device 210 to reroute the bit stream. In this way, network device 210 determines the estimated BER when network device 210 is associated with a BER that is historically above the accuracy threshold based on division, which conserves processor resources. Further, network device 210 notifies another network device 210 that the estimated BER satisfies a service threshold based on a link failure state indication that network device 210 transmits based on the hardcoded threshold, which conserves processor resources and network bandwidth and simplifies implementation of network device 210.

As indicated above, FIGS. 6A-6F are provided merely as examples. Other examples are possible and may differ from what was described with regard to FIGS. 6A-6F.

In this way, a network device determines an estimated BER based on burst check bit error counts, or based on a sliding window approach, when the burst check bit error counts are insufficiently precise. Further, the network device notifies another network device that the estimated BER satisfies a service threshold based on a link failure state indication that network device 210 transmits based on the hardcoded threshold, which conserves processor resources and network bandwidth and simplifies implementation of the network device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively couple to the one or more memories, to:
identify a quantity of bit errors that occur in a bit stream during a time interval;
select an approach for determining an estimated bit error rate (BER) for the bit stream based on the quantity of bit errors,
a first approach being selected when the device detects errors more frequently than a BER identified by an accuracy threshold,
the first approach to determine the estimated BER for the bit stream based on a previously determined BER, or
a second approach being selected when the device detects errors less frequently than the BER identified by the accuracy threshold,
the second approach to determine the estimated BER for the bit stream based on a sliding window;
determine the estimated BER for the bit stream using the selected approach; and
selectively perform an action based on whether the estimated BER satisfies the accuracy threshold,
the action including at least one of:
providing information to another device indicating that the estimated BER satisfies the accuracy threshold,
rerouting the bit stream to the another device, or
providing a link failure state indication to the another device.

2. The device of claim 1, where the one or more processors, when selecting the approach for determining the estimated BER for the bit stream, are to:
select the approach for determining the estimated BER for the bit stream based on the quantity of bit errors being zero.

3. The device of claim 1, where the one or more processors, when selecting the approach for determining the estimated BER for the bit stream, are to:
select the approach for determining the estimated BER for the bit stream based on the quantity of bit errors being one; and
store the quantity of bit errors in one or more memories.

4. The device of claim 3, where the one or more processors, when selecting the approach for determining the estimated BER for the bit stream, are to:
select the approach for determining the estimated BER for the bit stream based on whether the estimated BER is likely to satisfy the accuracy threshold,
the estimated BER being determined based on the quantity of bit errors and the time interval when the estimated BER is likely to satisfy the accuracy threshold, and
the estimated BER being determined based on the sliding window when the estimated BER is unlikely to satisfy the accuracy threshold.

5. The device of claim 4, where the one or more processors, when determining the estimated BER based on the sliding window, are to:
determine a first window corresponding to a first bit error rate and a first projected bit error count to observe in the first window to estimate the first bit error rate;
obtain bit error information identifying an observed bit error count in the first window;
determine, based on the observed bit error count not being greater than the first projected bit error count, that the estimated bit error rate is equal to the first bit error rate; and
determine, based on the observed bit error count being greater than the first projected bit error count, a second window corresponding to a second bit error rate and a second projected bit error count to observe in the second window to estimate the second bit error rate.

6. The device of claim 1, where the one or more processors, when selecting the approach for determining the estimated BER for the bit stream, are to:
select the approach for determining the estimated BER for the bit stream based on the quantity of bit errors being greater than one; and where the one or more processors, when determining the estimated BER for the bit stream, are to:
    determine that an error burst has occurred,
    obtain, based on determining that the error burst has occurred, a first burst check bit error count based on a burst check interval,
    obtain, based on the first burst check bit error count not identifying zero bit errors, a second burst check bit error count based on the burst check interval, and
    determine, based on the second burst check bit error count not identifying zero bit errors, the estimated BER based on the first burst check bit error count and the second burst check bit error count.

7. The device of claim 6, where the one or more processors are further to:
    set, based on the first burst check bit error count identifying zero bit errors, a current bit error count to one bit error; and
    determine the estimated BER based on whether the estimated BER is likely to satisfy the accuracy threshold.

8. A non-transitory computer-readable medium storing instructions, the instructions comprising:
    one or more instructions that, when executed by one or more processors, cause the one or more processors to:
        identify a quantity of bit errors that occur in a bit stream during a time interval;
        select an approach for determining an estimated bit error rate (BER) for the bit stream based on the quantity of bit errors,
            a first approach being selected when the device detects errors more frequently than a BER identified by an accuracy threshold,
                the first approach to determine the estimated BER for the bit stream based on a previously determined BER, or
            a second approach being selected when the device detects errors less frequently than the BER identified by the accuracy threshold,
                the second approach to determine the estimated BER for the bit stream based on a sliding window;
        determine the estimated BER for the bit stream using the selected approach; and
        selectively perform an action based on whether the estimated BER satisfies the accuracy threshold,
            the action including at least one of:
                providing information to another device indicating that the estimated BER satisfies the accuracy threshold,
                rerouting the bit stream to the another device, or
                providing a link failure state indication to the another device.

9. The non-transitory computer-readable medium of claim 8, where the one or more instructions, that cause the one or more processors to select the approach for determining the estimated BER for the bit stream, cause the one or more processors to:
    select the approach for determining the estimated BER for the bit stream based on the quantity of bit errors being zero.

10. The non-transitory computer-readable medium of claim 8, where the one or more instructions, that cause the one or more processors to select the approach for determining the estimated BER for the bit stream, cause the one or more processors to:
    select the approach for determining the estimated BER for the bit stream based on the quantity of bit errors being one; and
    store the quantity of bit errors in one or more memories.

11. The non-transitory computer-readable medium of claim 10, where the one or more instructions, that cause the one or more processors to select the approach for determining the estimated BER for the bit stream, cause the one or more processors to:
    select the approach for determining the estimated BER for the bit stream based on whether the estimated BER is likely to satisfy the accuracy threshold,
        the estimated BER being determined based on the quantity of bit errors and the time interval when the estimated BER is likely to satisfy the accuracy threshold, and
        the estimated BER being determined based on the sliding window when the estimated BER is unlikely to satisfy the accuracy threshold.

12. The non-transitory computer-readable medium of claim 11, where the one or more instructions, that cause the one or more processors to determine the estimated BER based on the sliding window, cause the one or more processors to:
    determine a first window corresponding to a first bit error rate and a first projected bit error count to observe in the first window to estimate the first bit error rate;
    obtain bit error information identifying an observed bit error count in the first window;
    determine, based on the observed bit error count not being greater than the first projected bit error count, that the estimated bit error rate is equal to the first bit error rate; and
    determine, based on the observed bit error count being greater than the first projected bit error count, a second window corresponding to a second bit error rate and a second projected bit error count to observe in the second window to estimate the second bit error rate.

13. The non-transitory computer-readable medium of claim 8, where the one or more instructions, that cause the one or more processors to select the approach for determining the estimated BER for the bit stream, cause the one or more processors to:
    select the approach for determining the estimated BER for the bit stream based on the quantity of bit errors being greater than one; and
    where the one or more instructions, that cause the one or more processors to determine the estimated BER for the bit stream, cause the one or more processors to:
        determine that an error burst has occurred,
        obtain, based on determining that the error burst has occurred, a first burst check bit error count based on a burst check interval,
        obtain, based on the first burst check bit error count not identifying zero bit errors, a second burst check bit error count based on the burst check interval, and
        determine, based on the second burst check bit error count not identifying zero bit errors, the estimated BER based on the first burst check bit error count and the second burst check bit error count.

14. The non-transitory computer-readable medium of claim 13, where the one or more instructions further cause the one or more processors to:
    set, based on the first burst check bit error count identifying zero bit errors, a current bit error count to one bit error; and determine the estimated BER based on whether the estimated BER satisfies the accuracy threshold.

15. A method, comprising:

identifying, by a device, a quantity of bit errors that occur in a bit stream during a time interval;

selecting, by the device, an approach for determining an estimated bit error rate (BER) for the bit stream based on the quantity of bit errors, a first approach being selected when the device detects errors more frequently than a BER identified by an accuracy threshold, the first approach to determine the estimated BER for the bit stream based on a previously determined BER, or a second approach being selected when the device detects errors less frequently than the BER identified by the accuracy threshold, the second approach to determine the estimated BER for the bit stream based on a sliding window;

determining, by the device, the estimated BER for the bit stream using the selected approach; and selectively performing, by the device, an action based on whether the estimated BER satisfies the accuracy threshold, the action including at least one of:

providing information to another device indicating that the estimated BER satisfies the accuracy threshold, rerouting the bit stream to the another device, or providing a link failure state indication to the device.

16. The method of claim 15, where selecting the approach for determining the estimated BER comprises:

selecting the approach for determining the estimated BER based on the quantity of bit errors being zero.

17. The method of claim 15, where selecting the approach for determining the estimated BER for the bit stream comprises:

selecting the approach for determining the estimated BER for the bit stream based on the quantity of bit errors being one; and storing the quantity of bit errors in one or more memories.

18. The method of claim 17, where selecting the approach for determining the estimated BER for the bit stream comprises:

selecting the approach for determining the estimated BER for the bit stream based on whether the estimated BER is likely to satisfy the accuracy threshold, the estimated BER being determined based on the quantity of bit errors and the time interval when the estimated BER is likely to satisfy the accuracy threshold, and the estimated BER being determined based on a sliding window when the estimated BER is unlikely to satisfy the accuracy threshold; and where determining the estimated BER based on the sliding window comprises:

determining a first window corresponding to a first bit error rate and a first projected bit error count to observe in the first window to estimate the first bit error rate, obtaining bit error information identifying an observed bit error count in the first window, determining, based on the observed bit error count not being greater than the first projected bit error count, that the estimated bit error rate is equal to the first bit error rate, and determining, based on the observed bit error count being greater than the first projected bit error count, a second window corresponding to a second bit error rate and a second projected bit error count to observe in the second window to estimate the second bit error rate.

19. The method of claim 15, where selecting the approach for determining the estimated BER for the bit stream comprises:

selecting the approach for determining the estimated BER for the bit stream based on the quantity of bit errors being greater than one; and where determining the estimated BER for the bit stream comprises:

determining that an error burst has occurred, obtaining, based on determining that the error burst has occurred, a first burst check bit error count based on a burst check interval, obtaining, based on the first burst check bit error count not identifying zero bit errors, a second burst check bit error count based on the burst check interval, and determining, based on the second burst check bit error count not identifying zero bit errors, the estimated BER based on the first burst check bit error count and the second burst check bit error count.

20. The method of claim 19, further comprising:

setting, based on the first burst check bit error count identifying zero bit errors, a current bit error count to one bit error; and determining the estimated BER based on whether the estimated BER satisfies the accuracy threshold.

* * * * *